(12) United States Patent
Kitamoto et al.

(10) Patent No.: US 7,698,107 B2
(45) Date of Patent: Apr. 13, 2010

(54) MANAGING APPARATUS FOR SUBSTRATE PROCESSING SYSTEM

(75) Inventors: Toru Kitamoto, Kyoto (JP); Kenji Kamei, Kyoto (JP); Hidekazu Inoue, Kyoto (JP); Tetsuya Hamada, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 11/839,134

(22) Filed: Aug. 15, 2007

(65) Prior Publication Data

US 2007/0294058 A1 Dec. 20, 2007

Related U.S. Application Data

(62) Division of application No. 10/232,319, filed on Aug. 29, 2002, now Pat. No. 7,280,883.

(30) Foreign Application Priority Data

| Sep. 6, 2001 | (JP) | ............................... 2001-270584 |
| Sep. 6, 2001 | (JP) | ............................... 2001-270699 |
| Sep. 7, 2001 | (JP) | ............................... 2001-271369 |
| Sep. 7, 2001 | (JP) | ............................... 2001-271599 |

(51) Int. Cl.
*G06F 11/30* (2006.01)
*G21C 17/00* (2006.01)
(52) U.S. Cl. ........................ 702/188; 702/183; 702/184; 700/121
(58) Field of Classification Search ................. 702/188, 702/184, 183; 700/121
See application file for complete search history.

(56) References Cited

U.S. PATENT DOCUMENTS 5,594,529 A 1/1997 Yamashita et al. ............. 399/8

(Continued)

FOREIGN PATENT DOCUMENTS

JP 62-133719 6/1987

(Continued)

OTHER PUBLICATIONS

Untranslated Office Action issued by Chinese Patent Office for corresponding Chinese patent application No. 200510071203 on May 11, 2007.

(Continued)

*Primary Examiner*—Eliseo Ramos Feliciano
*Assistant Examiner*—Janet L Suglo
(74) *Attorney, Agent, or Firm*—Ostrolenk Faber LLP

(57) ABSTRACT

A substrate processing apparatus and an information storage server are connected with each other through a network. A storage part of the substrate processing apparatus stores set information and a control program, for controlling operation of the substrate processing apparatus according to the set information and the control program. The substrate processing apparatus is provided with a schedule function, for transmitting a backup instructional command according to the schedule. In response to this instructional command, the substrate processing apparatus generates a duplicate of specified information stored in the aforementioned storage part and transfers the duplicate information to the information storage server through the network. The information storage server stores the received duplicate information in a hard disk as backup data. The information storage server can also store only differential data of the duplicate information. Thus, information for controlling the operation of the substrate processing apparatus can be efficiently backed up without burdening the user.

6 Claims, 20 Drawing Sheets

U.S. PATENT DOCUMENTS

| | | | | |
|---|---|---|---|---|
| 5,787,000 | A * | 7/1998 | Lilly et al. | 700/95 |
| 5,867,389 | A | 2/1999 | Hamada et al. | 700/121 |
| 6,223,137 | B1 * | 4/2001 | McCay et al. | 702/184 |
| 6,408,220 | B1 * | 6/2002 | Nulman | 700/121 |
| 6,438,440 | B1 * | 8/2002 | Hayashi | 700/121 |
| 6,556,949 | B1 * | 4/2003 | Lyon | 702/182 |
| 6,567,718 | B1 * | 5/2003 | Campbell et al. | 700/121 |
| 6,952,656 | B1 * | 10/2005 | Cordova et al. | 702/117 |
| 2002/0123864 | A1 * | 9/2002 | Eryurek et al. | 702/188 |

FOREIGN PATENT DOCUMENTS

| | | |
|---|---|---|
| JP | 9-129529 | 5/1997 |
| JP | 10-242092 | 9/1998 |
| JP | 10-274919 | 10/1998 |
| JP | 11-344920 | 12/1999 |
| JP | 2000-21740 | 1/2000 |
| JP | 2000-31030 | 1/2000 |
| JP | 2000-195775 | 7/2000 |
| KR | 1999-58399 | 7/1999 |
| KR | 2000-0072763 | 12/2000 |

OTHER PUBLICATIONS

English translation of Chinese Office Action dated May 11, 2007 provided in lieu of a Statement of Relevancy of the present invention to the teachings of the prior art.

Letter from Chinese associate dated Jun. 21, 2007 forwarding the Office Action dated May 11, 2007 to Japanese associate, including discussion of relevancy thereof.

Untranslated letter from Chinese associate dated Jun. 30, 2004 enclosing Chinese Office Action and cited prior art.

Office Action issued by Chinese Patent Office for corresponding Chinese application No. 02142579.5 dated May 28, 2004 and English translation thereof.

China Mechanical Engineering, Jul. 2000, vol. 11, 7th issue, pp. 753-756 and English translation of relevant portions thereof.

Computer Engineering and Application, Nov. 1999, pp. 113-116 and English translation of relevant portions thereof.

Journal of Jiangsu University of Science and Technology, Sep. 1998, vol. 19, 5th issue, pp. 78-84 and English translation of relevant portions thereof.

Untranslated letter from Korean associate dated Jun. 3, 2004 enclosing Korean Office Action and cited prior art.

Untranslated Office Action issued by Korean Patent Office for corresponding Korean patent application on May 29, 2004.

English translation of relevant portions of Korean Patent Application Laid-Open No. 1999-58399.

English translation of relevant portions of Korean Patent Application Laid-Open No. 2000-72763.

Untranslated Office Action issued by Japanese Patent Office for corresponding Japanese patent application No. JP2001-270584 on Aug. 2, 2005.

English translation of relevant parts of Japanese Office Action dated Aug. 2, 2005 provided in lieu of a Statement of Relevancy of the present invention to the teachings of the prior art.

Untranslated Office Action issued by Japanese Patent Office for corresponding Japanese patent application No. 2001-271369 on Nov. 8, 2005.

English translation of relevant parts of Japanese Office Action dated Nov. 8, 2005 provided in lieu of a Statement of Relevancy of the present invention to the teachings of the prior art.

U.S. Appl. No. 10/189,975, filed Jul. 2, 2002.

* cited by examiner

| STEP | TRANSFER DESTINATION |
|---|---|
| 1 | HOT PLATE |
| 2 | COOL PLATE |
| 3 | COATING PROCESSING UNIT |
| 4 | HOT PLATE |
| 5 | COOL PLATE |
| 6 | EXPOSURE APPARATUS |
| 7 | HOT PLATE |
| 8 | COOL PLATE |
| 9 | DEVELOPMENT PROCESSING UNIT |
| 10 | HOT PLATE |
| 11 | COOL PLATE |

| APPARATUS | COMPONENT | USED TIME | NUMBER OF PROCESSED SUBSTRATES |
|---|---|---|---|
| 8100 | BRUSH 1 | 45 | — |
| | BRUSH 2 | 12 | — |
| | BRUSH 3 | 22 | — |
| | • | • | • |
| | • | • | • |
| | • | • | • |
| 8102 | BRUSH 1 | 5 | — |
| | • | • | • |
| | • | • | • |

MANAGING APPARATUS FOR SUBSTRATE PROCESSING SYSTEM

CROSS REFERENCE TO RELATED APPLICATIONS

This is a divisional of U.S. patent application Ser. No. 10/232,319, filed Aug. 29, 2002 now U.S. Pat. No. 7,280,883 in the name of Toru KITAMOTO, et al. and entitled SUBSTRATE PROCESSING SYSTEM MANAGING APPARATUS INFORMATION OF SUBSTRATE PROCESSING APPARATUS, which is based upon and claims the benefit of priority from the prior Japanese Patent Application No. 2001-270699 filed Sep. 6, 2001, Japanese Patent Application No. 2001-271599 filed Sep. 7, 2001, Japanese Patent Application No. 2001-270584 filed Sep. 6, 2001 and Japanese Patent Application No. 2001-271369 filed Sep. 7, 2001, the entire contents of which are incorporated herein by reference.

BACKGROUND OF THE INVENTION

1. Field of the Invention

The present invention relates to a network communication technique connecting a substrate processing apparatus performing prescribed processing on a semiconductor substrate, a glass substrate for a liquid crystal display, a glass substrate for a photomask or a substrate for an optical disk (hereinafter simply referred to as "substrate") and a computer, with each other through a communication network.

2. Description of the Background Art

A product such as a semiconductor device or a liquid crystal display is manufactured by performing a series of processing steps such as cleaning, resist coating, exposure, development, etching, formation of an interlayer dielectric film and thermal processing, on a substrate. In general, a substrate processing apparatus having a built-in resist coating processing, a built-in development processing unit etc., performs such processing steps. A transfer robot provided on the substrate processing apparatus successively transfers the substrate to the respective processing units thereby performing the series of processing steps on the substrate.

Such substrate processing is automatically controlled, and the substrate processing apparatus stores application program data, set information etc. for the automatic control. In other words, the substrate processing apparatus is controlled through the application program according to the contents of the set information.

The set information stored in the substrate processing apparatus includes basic information employed in common for the substrate processing apparatus and information intrinsic to the substrate processing apparatus. While the substrate processing apparatus is essentially controllable by basic information set by default, optimum control cannot be performed with the same set contents as a result of a differing set environment or a manufacturing error of the substrate processing apparatus. Therefore, the basic information must be corrected for performing control procedures, and each substrate processing apparatus accumulates this corrected information as intrinsic information.

The intrinsic information is information intrinsic to every user and every substrate processing apparatus. In order to return a substrate processing apparatus having some fault, such as a hardware fault (with loss of accumulated information) to the state before the occurrence of the fault, it is necessary to periodically back up the set information. When the user changes the set information in a self-determined manner, past set information may be required. In order to operate the substrate processing apparatus with the past set information in this case, it is necessary to periodically back up the set information. In general, the user backs up the set information on a removable disk or the like in each substrate processing apparatus.

However, it is extremely time-consuming to back up the set information of the substrate processing apparatus on the removable disk or the like, leading to a burden on the user. When a large number of substrate processing apparatuses are set, the backup operation particularly burdens the user.

Further, it is necessary to minimize the interval for backup processing so that the backup data is effective. However, the burden of the backup processing is so heavy that it is impractical to require the user to frequently perform periodic backup processing.

The aforementioned basic information of a set in the substrate processing apparatus in an initial stage, consists of an extremely large number of set items. The user or a member of a support staff, first sets the basic information in the substrate processing apparatus, thereby operating the substrate processing apparatus according to the basic information. The user then sets intrinsic information in response to the individual substrate processing apparatus. In other words, the user corrects the operation of the substrate processing apparatus set according to the basic information, with the intrinsic information thereby performing optimum control.

As hereinabove described, the basic information to be set in the substrate processing apparatus consists of an extremely large number of set items. If the set information is erroneous with respect to some of the large number of items, the substrate processing apparatus cannot perform a planned operation.

When a number of different substrate processing apparatuses are provided by operating staff with basic information the set contents of the basic information may vary with the substrate processing apparatuses due to introduced artificial errors. In this case, the same products cannot be produced even if the substrate processing apparatuses execute the same processing steps.

When it is proven that the basic information set in each substrate processing apparatus includes a set error from the results of operation of the substrate processing apparatus, it is extremely difficult to find the erroneous set contents from the large number of set items.

Components forming the aforementioned substrate processing apparatus also include consumables. For example, cleaning brushes provided in a cleaning processing unit for cleaning substrates or lamps provided in a lamp annealing apparatus for rapidly annealing substrates by photoirradiation are typical consumables. Further, belts, cylinders, motors etc. forming a driving mechanism for driving the transfer robot or the like are also consumables.

Such consumables are consumed or deteriorate as used and become entirely unusable with excessive use. It is thus necessary to periodically order new components for replacement of the consumables.

In general, new components are ordered and procured only after the consumables are consumed or rendered unusable. Therefore, processing time is wasted until arrival of the new components thereby disadvantageously reducing the working efficiency of the apparatus. While it is preferable to manage the usable life of the consumables in the substrate processing apparatus, a large number of substrate processing apparatuses are usually arranged in a single substrate processing factory and excessive effort is required for managing consumables of all substrate processing apparatuses.

In addition, since a large number of such substrate processing apparatuses are arranged in a single substrate processing factory for manufacturing semiconductor devices or the like they are operated by a number of operators. It is accordingly necessary to properly educate inexperienced unskilled operators with respect to the method of operating the apparatuses. When specifications etc. of the apparatuses are changed, it is also necessary to instruct even skilled operators about the new operating method.

The operators must divide into groups for attending a lecture about the apparatuses which lecture is repetitively delivered to the groups. Alternatively, the groups are gathered around a single substrate processing apparatus for getting a collective explanation thereof.

Because lectures must be repeated, with the same contents or not all operators will not be sufficiently or properly trained, there is a marked disadvantageous inefficiency for both users and vendors of the substrate processing apparatuses.

SUMMARY OF THE INVENTION

The present invention is directed to a substrate processing apparatus management system managing a substrate processing apparatus capable of communicating through a network.

According to an aspect of the present invention, a substrate processing apparatus management system managing a substrate processing apparatus capable of communicating through a network, comprises a first storage element storing control information for controlling operation of the substrate processing apparatus, a duplicate information acquisition element acquiring duplicate information of the control information stored in the first storage element, and a storing element storing the duplicate information acquired by the duplicate information acquisition element in a second storage element comprised in an information storage computer connected to the substrate processing apparatus through the network.

The storage element of the information storage computer connected through the network stores the control information for the substrate processing apparatus, whereby no backup operation to a recording medium is necessary. Thus, a user's burden related to backup operation can be remarkably abated.

In a substrate processing apparatus management system connecting a substrate processing apparatus and a support computer with each other through a network according to another aspect of the present invention, the support computer comprises a first storage element storing basic information necessary in initialization of the substrate processing apparatus, and a basic information transmission element transmitting the basic information to the substrate processing apparatus through the network. The substrate processing apparatus comprises a second storage element storing the basic 1 information received from the support computer, and the initial state of the substrate processing apparatus is set up with the basic information stored in the second storage element.

Initialization can be correctly and readily performed in introduction or resetting of the substrate processing apparatus.

In a substrate processing apparatus management system having a substrate processing apparatus and a computer managing the substrate processing apparatus, both connected to a network, in still another aspect of the present invention, the substrate processing apparatus comprises a utilization consumption measuring element measuring utilization consumption of a component of the substrate processing apparatus, and the substrate processing apparatus management system comprises a utilization consumption information accumulation element accumulating the utilization consumption measured by the consumptiveness measuring element, and a utilization consumption information uploading element rendering the utilization consumption information accumulated in the utilization consumption information accumulation element accessible from the computer through the communication network.

The utilization consumption of the component of the substrate processing apparatus can be efficiently managed.

According to a further aspect of the present invention, the computer comprises an educational information distribution element distributing educational information related to operation of the plurality of substrate processing apparatuses through the communication network. Each of the plurality of substrate processing apparatuses comprises a receiving element receiving the educational information distributed from the computer, and a display element displaying the educational information received by the receiving element.

The computer distributes the educational information related to operation of the plurality of substrate processing apparatuses through the communication network, whereby operational education can be efficiently given to operators.

The present invention is also directed to a substrate processing apparatus management method for managing a substrate processing apparatus.

The present invention is yet further directed to a substrate processing apparatus connected with a prescribed computer through a communication network.

Accordingly, an object of the present invention is to provide a technique of readily backing up information stored in a substrate processing apparatus while alleviating the job burden on a user.

Another object of the present invention is to provide a network system for readily and reliably setting initial operation of a substrate processing apparatus while reducing the job burden on a user or a support staff.

Still another object of the present invention is to provide a technique capable of efficiently managing the utilization consumption of a component of a substrate processing apparatus.

A further object of the present invention is to provide a substrate processing system capable of efficiently operationally educating an operator.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates exemplary contents of recipe data;

FIG. 18 illustrates exemplary utilization consumption information;

DESCRIPTION OF THE PREFERRED EMBODIMENTS

Embodiments of the present invention are now described with reference to the drawings.

1. First Embodiment

Figure 1:
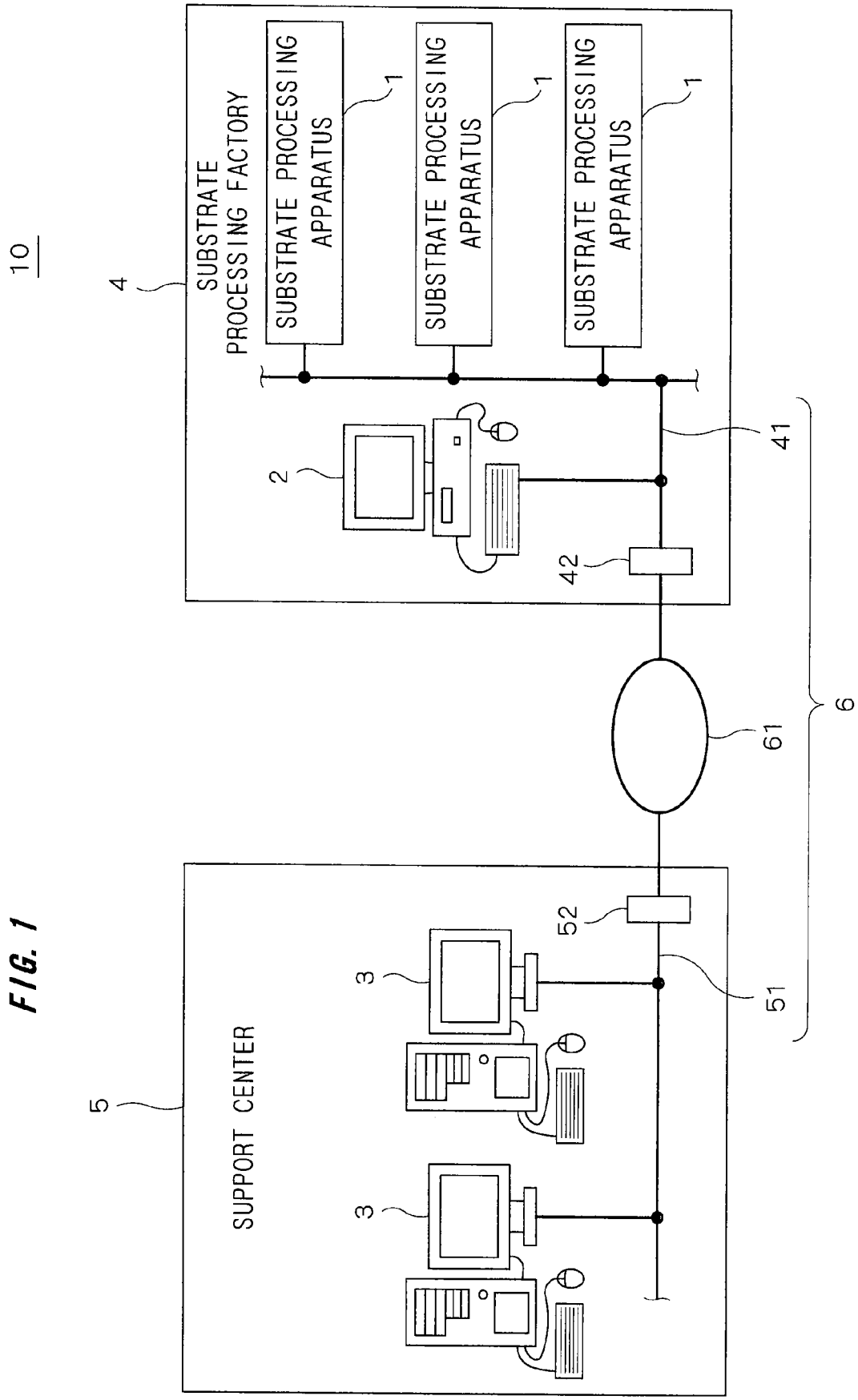
FIG. 1 is a schematic block diagram of a substrate processing system according to a first embodiment of the present invention.

First, the outline of the overall substrate processing system 10 according to a first embodiment of the present invention is described. FIG. 1 schematically illustrates the structure of the substrate processing system 10. As shown in FIG. 1, a plurality of substrate processing apparatuses 1 and an information storage server 2 comprised in a substrate processing factory 4 and support computers 3 comprised in a support center 5 are connected with each other through a network 6 in the substrate processing system 10. Remote control staffs remote-controlling the substrate processing apparatuses 1 are posted on the support center 5.

In the substrate processing factory 4, the substrate processing apparatuses 1 and the information storage server 2 are connected with each other through a LAN (local area network) 41. The LAN 41 is connected to a wide area network 61 such as the Internet through a connector 42 having functions of a router, a firewall and the like. The support center 5 also has a LAN 51 connected with the support computers 3, and this LAN 51 is also connected to the wide area network 61 through a connector 52 having functions of a router, a firewall and the like. Thus, the substrate processing apparatuses 1, the information storage server 2 and the support computers 3 can effect various types of data communication with each other. Throughout the specification, the LANs 41 and 51 and the wide area network 61 are generically referred to as a network 6.

Referring to FIG. 1, the substrate processing factory 4 may alternatively comprise a single substrate processing apparatus 1 in place of the plurality of substrate processing apparatuses 1, and the support center 5 may also alternatively comprise a single support computer 3 in place of the plurality of support computers 3.

Figure 2:
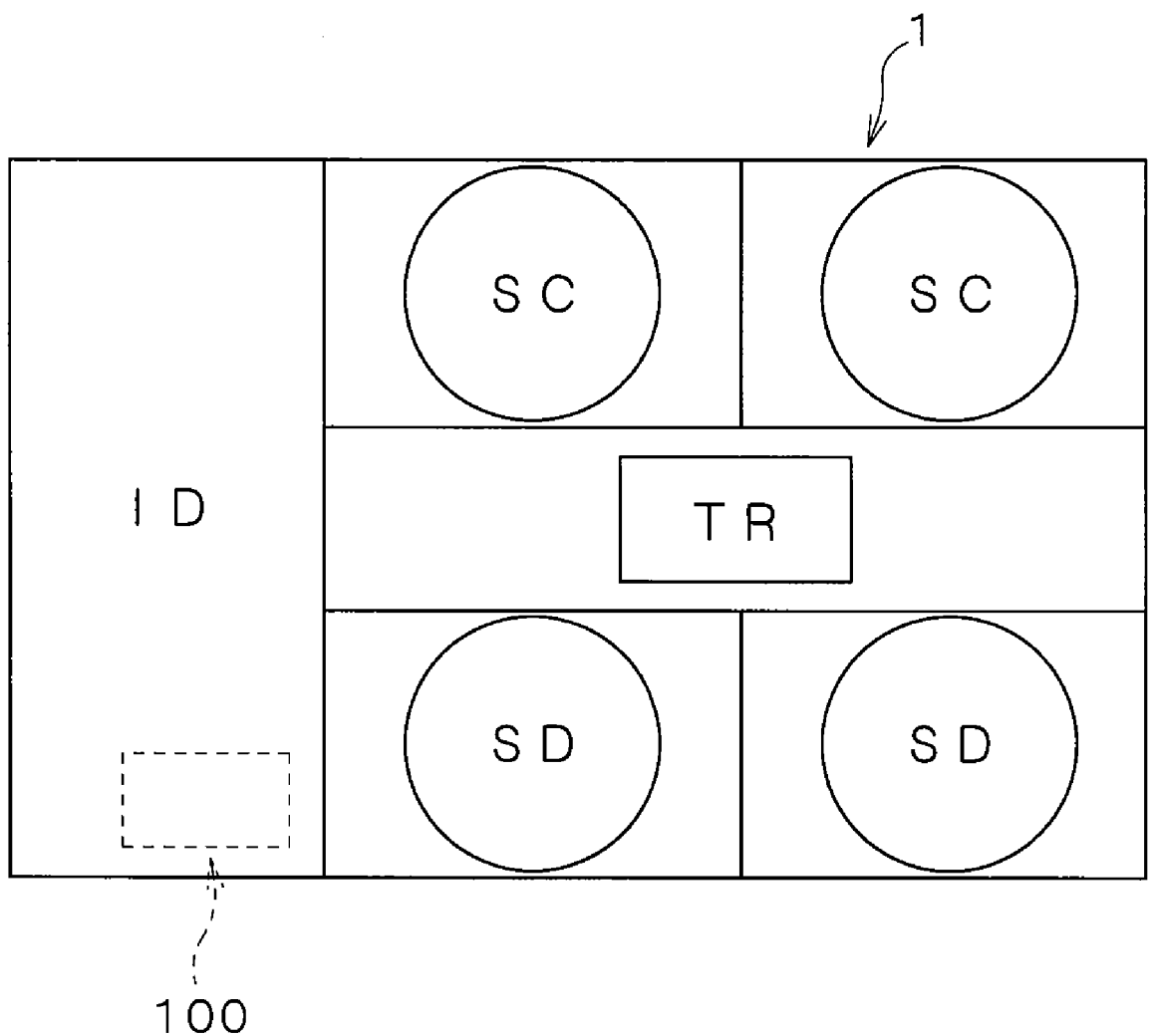
FIG. 2 is a schematic plan view of a substrate processing apparatus.

Each of the substrate processing apparatus 1 arranged on the substrate processing factory 4 is now described. FIG. 2 is a schematic plan view of the substrate processing apparatus 1. This substrate processing apparatus 1 performs resist coating processing, development processing and subsequent thermal processing on substrates. The substrate processing apparatus 1 comprises an indexer ID delivering unprocessed substrates from a carrier while receiving processed substrates and storing the same in the carrier, coating processing units (the so-called spin coaters) SC dropping photoresist on the main surfaces of substrates while rotating the substrates for coating the photoresist thereto, development processing units (the so-called spin developers) SD supplying a developer to exposed substrates thereby performing development processing and a transfer robot TR transferring the substrates between the indexer ID and each processing unit. Thermal processing units (not shown) are arranged above the coating processing units SC and the development processing units SD through a fan filter unit. A heating unit (the so-called hot plate) heating the substrates and a cooling unit (the so-called cool plate) cooling the heated substrates to a constant temperature are provided as the thermal processing units. Throughout the specification, the coating processing units SC, the development processing units SD and the thermal processing units are generically referred to as processing units 110 performing prescribed processing on the substrates.

Figure 3:
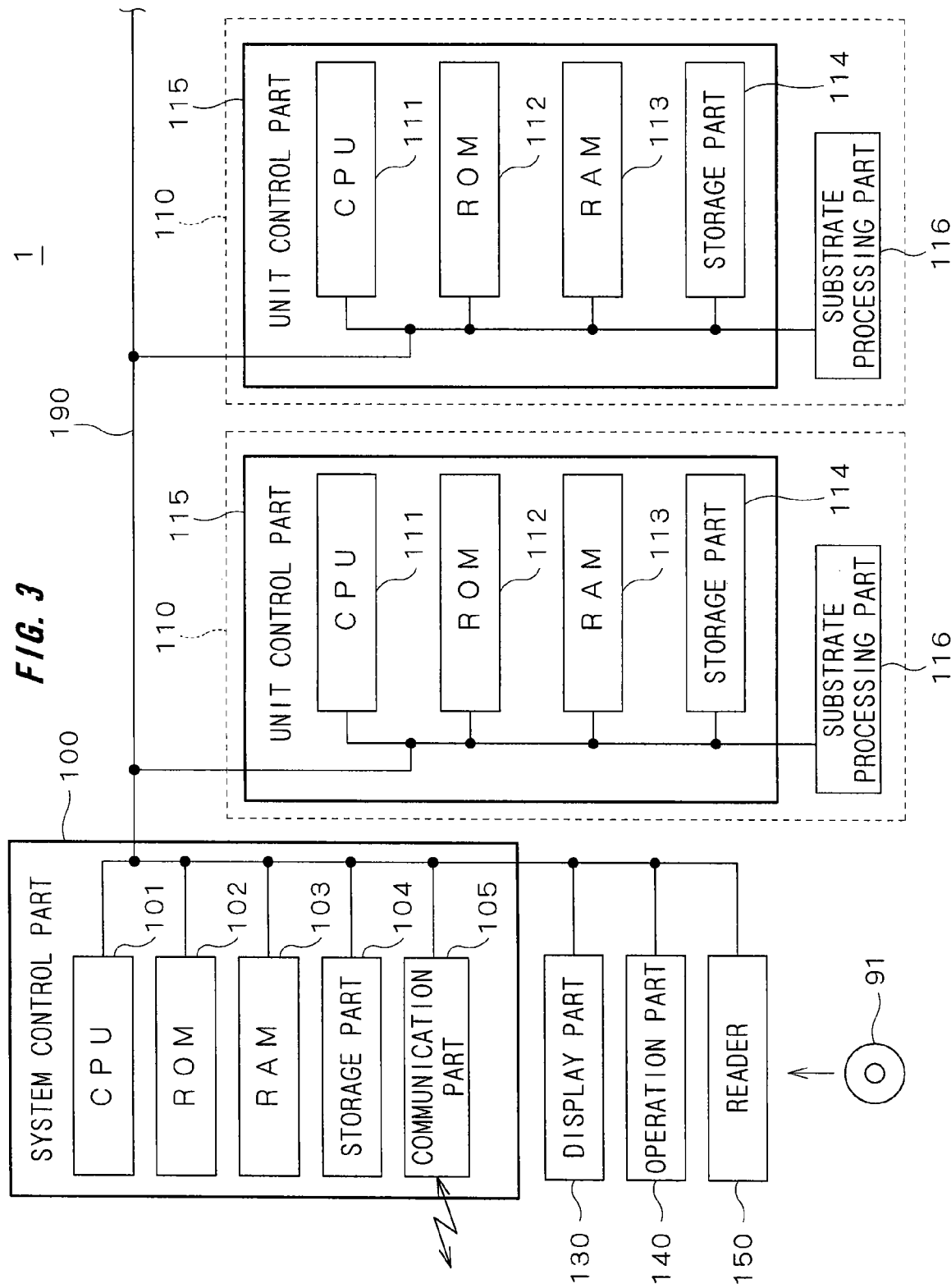
FIG. 3 is a block diagram showing the structure of a control system for the substrate processing apparatus.

FIG. 3 is a block diagram showing the structure of a control system for the substrate processing apparatus 1. As shown in FIG. 3, the control system for the substrate processing apparatus 1 is formed by a system control part 100 controlling the overall apparatus 1 and unit control parts 115 individually controlling the plurality of processing units 110.

The system control part 100 controlling the overall apparatus 1 in a unified manner comprises a microcomputer. More specifically, the system control part 100 comprises a CPU 101 serving as a body part, a ROM 102 serving as a read-only memory storing a basic program and the like, a RAM 103 serving as a random-access memory mainly defining an arithmetic working area, a storage part 104 consisting of a hard disk or the like storing application program data and the like and a communication part 105 performing data communication with an external device, which are connected with each other by a bus line 190.

The communication part 105 is connected to the network 6 through a network interface (not shown), so that the substrate processing apparatus 1 can transmit/receive various data to/from the information storage server 2, the support computers 3 and the like. While the communication part 105 may perform either wire communication or radio communication through the network 6, a wire communication system is employed in this embodiment.

Along with the system control part 100 and the plurality of processing units 110, a display part 130 displaying various information, an operation part 140 accepting recipe input operation, command operation etc. from an operator, a reader 150 reading various data from a recording medium 91 such as a magnetic disk or a magnetooptic disk and the like are also electrically connected to the bus line 190. Thus, data can be transferred between the respective parts of the substrate processing apparatus 1 through the bus line 190 under control of the system control part 100.

Each processing unit 110 comprises the unit control part 115 along with a substrate processing part 116 serving as a working part (a mechanism rotating the substrates, a mechanism discharging a processing solution to the substrates, a mechanism heating the substrates or the like, for example) processing the substrates in practice. The unit control part 115, individually controlling the processing unit 110, controls and monitors operation of the substrate processing part 116 of the processing unit 110 provided with this unit control part 115. In other words, the aforementioned system control part 100 takes charge of unified control of the overall substrate processing apparatus 1, while each unit control part 115 takes charge of control responsive to the processing contents of each substrate processing part 116. The unit control part 115 comprises a microcomputer similarly to the system control part 100. More specifically, the unit control part 115 comprises a CPU 111 serving as the body part, a ROM 112 serving as a read-only memory storing a basic program and the like, a RAM 113 serving as a random-access memory defining an arithmetic working area and a storage part 114 consisting of an SRAM backed up with a battery for storing various data.

Figure 7:
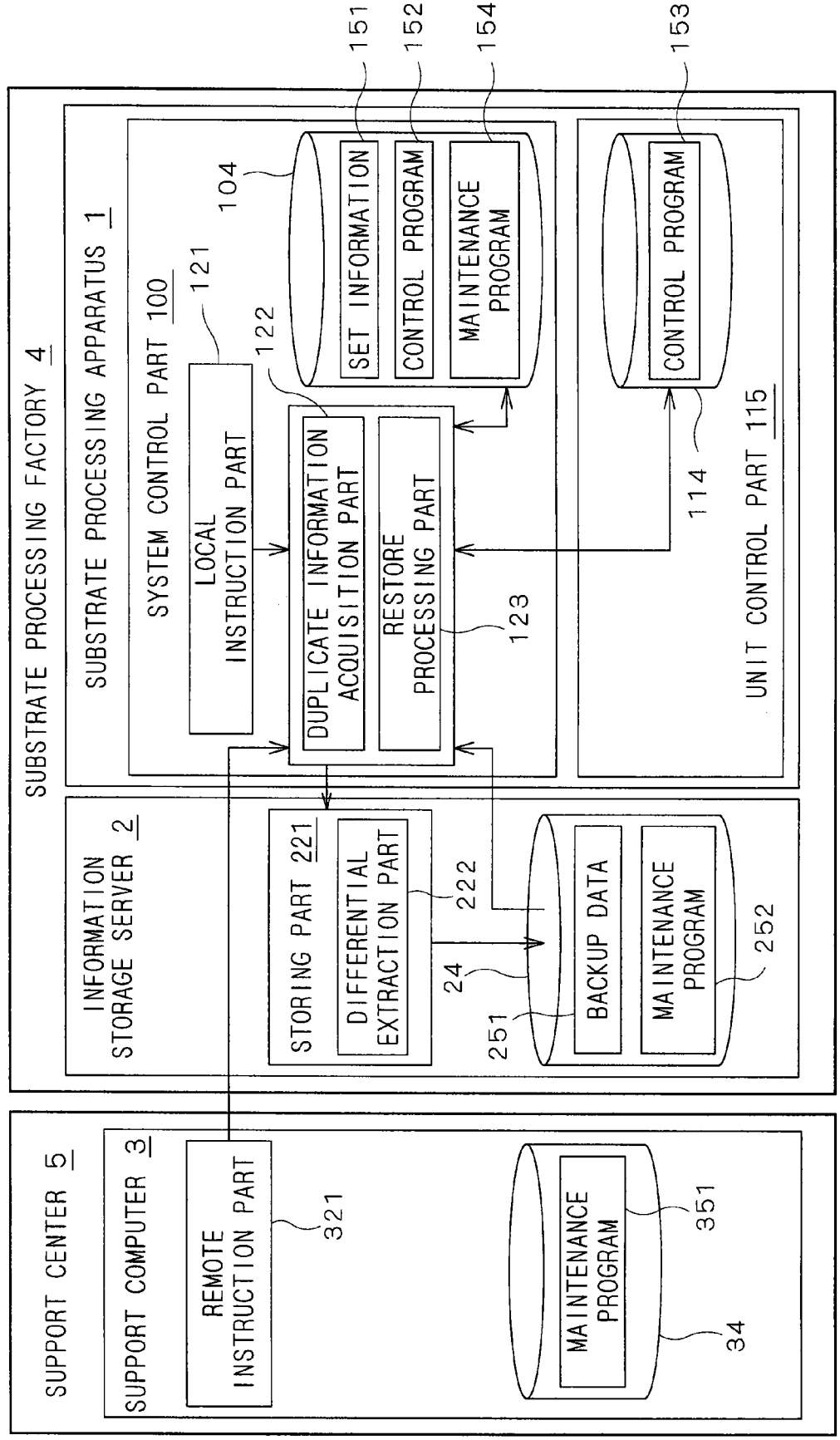
FIG. 7 is a block diagram showing the functional structure of the substrate processing system according to the first embodiment.

The storage part 104 of the system control part 100 stores a control program 152 serving as an application program for system control related to the overall apparatus 1, set information 151 for defining operation of the substrate processing apparatus 1 and the like (see FIG. 7). When the CPU 101 of the system control part 100 executes arithmetic processing according to the control program 152 and the set information 151, it follows that operation control and data processing are implemented on the overall substrate processing apparatus 1. The storage part 114 of the unit control part 115 stores a control program 153 serving as an application program for unit control responsive to the processing contents of the substrate processing part 116 of this processing unit 110. When the CPU 111 of the unit control part 115 executes arithmetic processing according to this control program 153, it follows that operation control and data processing are implemented on the substrate processing part 116.

Thus, control information for controlling the operation of the substrate processing apparatus 1 includes the control programs 152 and 153 for controlling the substrate processing apparatus 1 and the set information 151 for defining the operation of the substrate processing apparatus 1, while the storage parts 104 and 114 form first storage means storing the control information.

Figure 4:
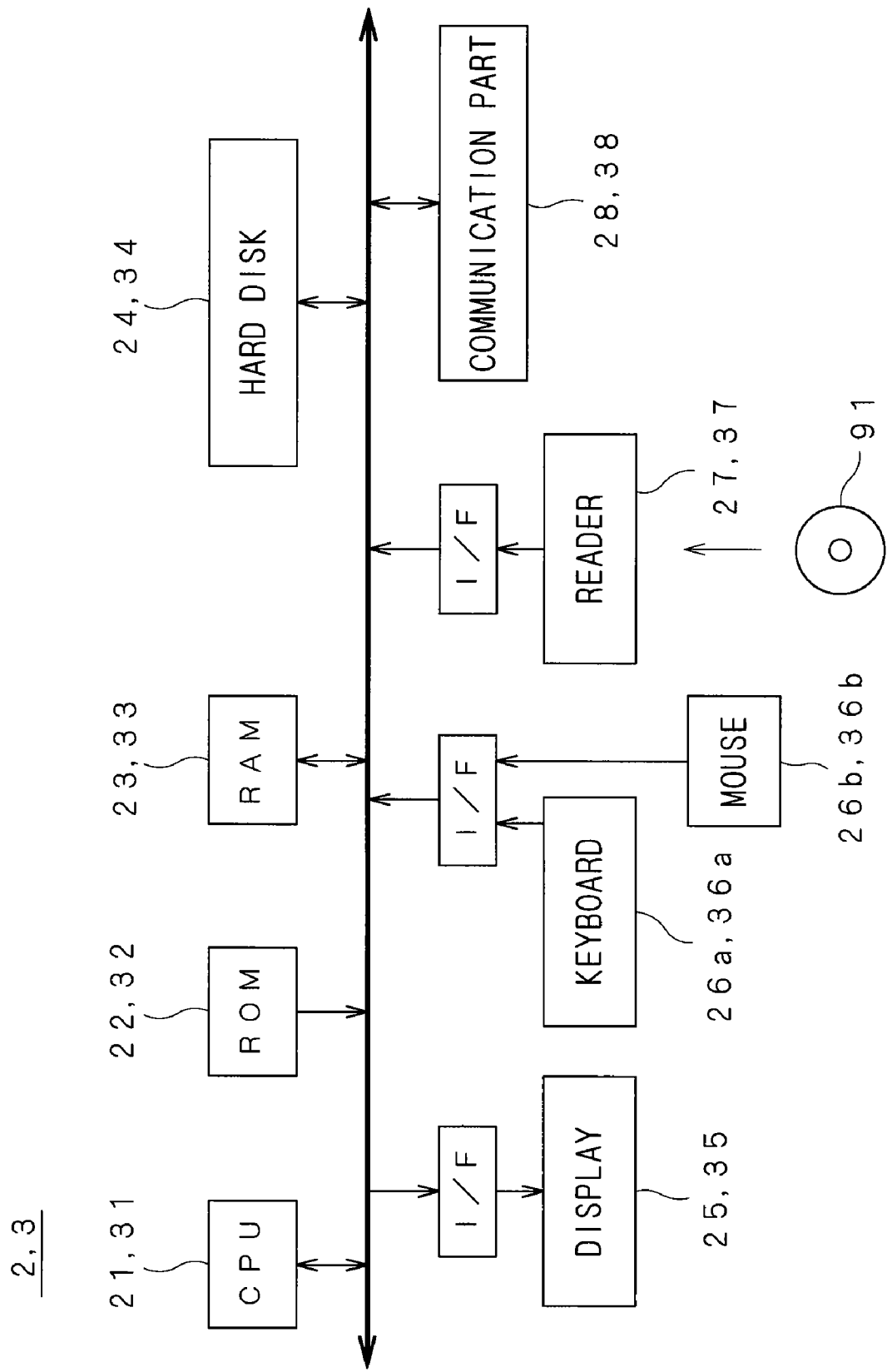
FIG. 4 illustrates the basic structure of an information storage server or a support computer.

The information storage server 2 arranged on the substrate processing factory 4 and each support computer 3 arranged on the support center 5 are now described. The information storage server 2 and the support computer 3 are similar in hardware structure to a general computer. Therefore, each of the basic structures of the information storage server 2 and the support computer 3, which are similar to each other, is described with reference to FIG. 4. As shown in FIG. 4, each of the information storage server 2 and the support computer 3 is formed by connecting a CPU 21 or 31 (the CPU 21 for the information storage server 2 and the CPU 31 for the support computer 3: this also applies to the following description), a ROM 22 or 32 storing the basic program and a RAM 23 or 33 storing various information to a bus line. A hard disk 24 or 34 storing various information such as an application program, a display 25 or 35 displaying various information, a keyboard 26a or 36a and a mouse 26b or 36b accepting input operation from the operator, a reader 27 or 37 reading various data from the recording medium 91 such as an optical disk, a magnetic disk or a magnetooptical disk and a communication part 28 or 38 making communication with the external device through the network 6 are also connected to the bus line properly through interfaces (I/F) or the like.

Each of the information storage server 2 and the support computer 3 can read data from the recording medium 91 through the reader 27 or 37 and store the same in the hard disk 24 or 34. Each of the information storage server 2 and the support computer 3 can also download data from another server through the network 6 and store the same in the hard disk 24 or 34. The CPU 21 or 31 executes arithmetic processing according to various programs stored in the hard disk 24 or 34 for performing various operation.

Figure 5:
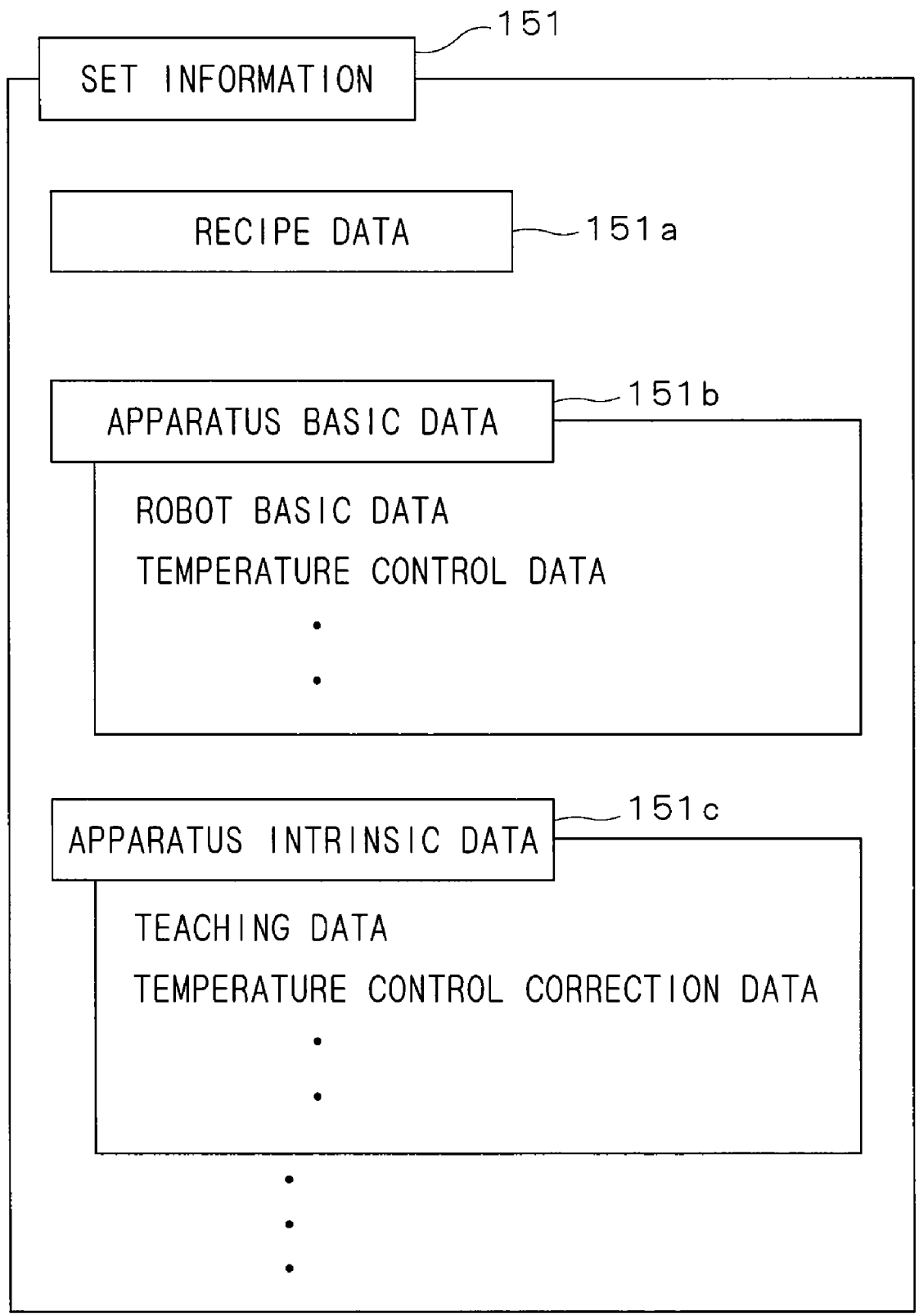
FIG. 5 illustrates exemplary contents of set information.

The operation of the substrate processing apparatus 1 is controlled by the control program 152 or 153 stored in the storage part 104 or 114 according to the procedure of a previously described flow recipe. The control program 152 or 153 controls the substrate processing apparatus 1 according to the set information 151 stored in the storage part 104. FIG. 5 illustrates exemplary contents of the set information 151 stored in the storage part 104.

The set information 151 includes set information related to total control of the substrate processing apparatus 1 and set information related to control of each processing unit 110, and it is assumed that the storage part 104 of the system control part 100 collectively stores the set information 151 including the same in this embodiment. Alternatively, the storage part 114 of each unit control part 115 may store the set information every processing unit 110.

The set information 151 is data including recipe data 151a, apparatus basic data 151b and apparatus intrinsic data 151c. The operator input-controls these data 151a, 151b and 151c through the operation part 140 thereby updating the same with correction at need. Alternatively, the support computer 3 or the information storage server 2 may input-control the set information 151 by remote control.

The recipe data 151a is data defining the procedure of the substrate processing apparatus 1. In other words, the transfer robot TR of the substrate processing apparatus 1 transfers the substrates to the target processing unit 110 according to a processing schedule described in the recipe data 151a.

FIG. 6 illustrates an exemplary flow recipe described in the recipe data 151a. Referring to FIG. 6, each substrate transferred by the transfer robot TR in a circulatory manner is processed in the following sequence:

Step 1: adhesion reinforcement processing in the hot plate;
Step 2: cooling processing in the cool plate;
Step 3: resist coating processing in any coating processing unit SC;
Step 4: prebake processing in the hot plate;

Thus, the recipe data 151a, which is information defining the procedure of the substrate processing apparatus 1, is stored as the know-how of a user. In other words, the user creates the recipe data 151a to be capable of performing most efficient processing, and controls the substrate processing apparatus 1 is controlled according to the recipe data 151a.

The apparatus basic data 151b is set information common to the substrate processing apparatus 1, i.e., default set information for the substrate processing apparatus 1. While the substrate processing apparatus 1 includes a large number of working parts and control parts such as the transfer robot TR an each processing unit 110, the apparatus basic data 151b defines set values for driving the working parts and the control parts. The apparatus basic data 151b includes data such as robot basic data, temperature control data and the like, for example.

The robot basic data defines the operation of the transfer robot TR. In other words, the robot basic data defines set values (a set value related to the distance of movement, a set value for the rotational angle of an arm etc.) for the operation of the transfer robot TR transferring the substrates to each processing unit 110, the indexer ID, the thermal processing units etc. The temperature control data sets the temperatures of the thermal processing units etc. in the substrate processing apparatus 1.

The apparatus intrinsic data 151c is correction data intrinsically set for each of the plurality of substrate processing apparatuses 1. While the substrate processing apparatuses 1 can be basically controlled with the same set information, i.e., the apparatus basic data 151b, when the same are identical in structure to each other, the set information must be corrected every apparatus 1 in practice. This is because the structures of the substrate processing apparatuses 1 are dispersed in a strict sense, and because adjustment responsive to environment is required due to the difference between set positions or set environment of the substrate processing apparatuses 1. In other words, the set information must be corrected every apparatus 1 so that the substrate processing apparatuses 1 perform the same processing thereby bringing the same processing results.

The apparatus intrinsic data 151c includes data such as teaching data and temperature control correction data.

The teaching data is data for correcting the aforementioned robot basic data. The transfer robot TR may basically perform the same operation according to the same set information when the substrate processing apparatuses 1 are identical in structure to each other. However, the transfer robot TR including a large number of components and movable parts causes an error in the operation due to subtle difference between the structures. Therefore, the operation of the transfer robot TR is adjusted to be optimum, and set information for this adjustment is stored as the teaching data. Control of the transfer robot TR can be optimized by correcting the robot basic data with the teaching data.

The temperature control correction data is data for correcting the temperature control data set by default in response to the difference between the set positions and the set environment of the substrate processing apparatuses 1.

Thus, the recipe data 151a decides the sequence of processing steps for each substrate processing apparatus 1, while the apparatus basic data 151b set by default and the apparatus intrinsic data 151c which is correction data every apparatus 1 control the operation of the substrate processing apparatus 1. While the recipe data 151a stored as the user's know-how and the apparatus intrinsic data 151c intrinsic to each apparatus 1 are extremely important information, it is not easy to restore these data 151a and 151c. Therefore, the data 151a and 151c must be efficiently backed up, to be prevented from disappearance.

While the hardware structures of the substrate processing system 10 and the substrate processing apparatus 1, the information storage server 2 and the support computer 3 forming the same and the contents of the set information 151 have been described, the functions and the processing contents of the substrate processing system 10 are now described. FIG. 7 is a functional block diagram showing the functional structure of the substrate processing system 10.

Referring to FIG. 7, the CPU 101 of the system control part 100 runs a maintenance program 154 thereby implementing a local instruction part 121, a duplicate information acquisition part 122 and a restore processing part 123 as processing parts. The storage part 104 stores the maintenance program 154.

Referring to FIG. 7, the CPU 21 of the information storage server 2 runs a maintenance program 252 thereby implementing a storing part 221 and a differential extraction part 222 as processing parts. The hard disk 24 stores the maintenance program 252. The CPU 31 of the support computer 3 runs a maintenance program 351 thereby implementing a remote instruction part 321 as a processing part. The hard disk 34 stores the maintenance program 351.

The local instruction part 121 has a function of transmitting an instructional command of backup processing for the set information 151 and the control programs 152 and 153 to the duplicate information acquisition part 122 and a function of transmitting an instructional command of restore processing for the set information 151 and the control programs 152 and 153 to the restore processing part 123.

The local instruction part 121 transmits the instructional command of the backup processing when determining the backup timing due to a schedule function provided therein. In addition to periodic backup processing according to the schedule function, the user may perform input operation through the operation part 140 of the substrate processing apparatus 1 for explicitly instructing backup processing for the set information 151 and the control programs 152 and 153.

In other words, the set information 151 and the like are automatically backed up in a planned manner due to an instruction according to the schedule function. On the other hand, the user may instruct backup processing in order to preserve the current apparatus state at an arbitrary point of time such as before maintenance or before temporary stoppage of the apparatus 1.

When the local instruction part 121 issues an instructional command for backup processing, the duplicate information acquisition part 122 generates duplicate information of the set information 151 and the control program 152 stored in the storage part 104 of the system control part 100 and the control program 153 stored in the storage part 114 of the unit control part 115 and transmits the generated duplicate information, i.e., the data of the set information 151 and the control programs 152 and 153, to the information storage server 2 through the LAN 41.

The backup processing may be performed on all data of the set information 151 and the control programs 152 and 153 or only individual data.

Figure 8:
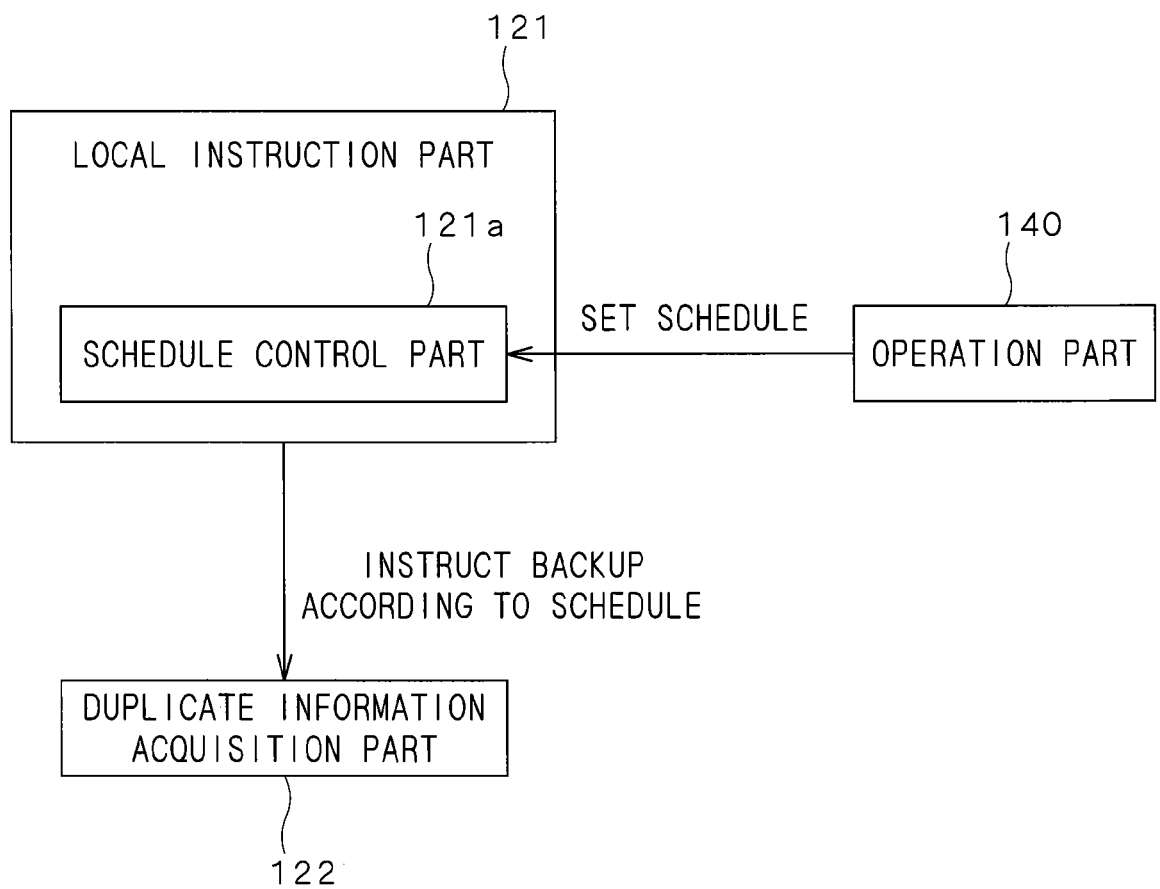
FIG. 8 is a block diagram of a local instruction part including a schedule control part according to the first embodiment.

As shown in FIG. 8, the local instruction part 121 comprises a schedule control part 121a. The schedule control part 121a is a functional part setting the schedule for the backup processing, and the local instruction part 121 transmits the instructional command for the backup processing according to the schedule set in the schedule control part 121a. Schedule setting shows which information is backed up at what timing.

For example, it is possible to schedule the backup processing to back up the set information 151 every week while backing up the control programs 152 and 153 every month. It is also possible to set whether to back up all data or to back up differential data, as described later. For example, it is possible to set a schedule to back up all data every week as to the set information 151 while backing up differential data every day. The user can set the schedule through the operation part 140. It is more convenient to display a guidance menu on the display part 130 so that the user can set the schedule according to the menu.

The duplicate information transmitted from the duplicate information acquisition part 122 is transferred to the storing part 221 of the information storage server 2 so that the storing part 221 stores the duplicate information in the hard disk 24 serving as second storage means. FIG. 7 shows the duplicate information stored in the hard disk 24 as backup data 251.

In order to back up differential data, i.e., when the schedule control part 121*a* specifies backup operation of the differential data or the user explicitly instructs to back up the differential data, the duplicate information acquisition part 122 adds information indicating backup of the differential data to the duplicate information and transmits the same to the storing part 221. While the storing part 221 can store the set information 151 and the control programs 152 and 153 in the hard disk 24 as full data, the differential extraction part 222 extracts differential data of backup object data and thereafter stores duplicate information in the hard disk 24 when receiving the information instructing to back up the differential data.

In other words, the differential extraction part 222 compares the duplicate information received from the duplicate information acquisition part 122 with the backup data 251 stored in the hard disk 24, and extracts the differential data.

For example, when periodically performing backup processing according to the schedule function of the local instruction part 121, the quantity of the backup data 251 stored in the hard disk 24 is markedly increased in a method of storing full data each time. Not only the latest data but also data backed up in the past may be required as the backup data 251. For example, a request for returning the set information for the apparatus 1 to a state of several weeks ago may be received. Further, a request for returning the flow recipe changed by trial and error to that of two months ago may be received.

Therefore, it is effective to leave the backup data 251 at a large number of points over a long period, though the capacity of the hard disk 24 is not unlimited. Therefore, the differential extraction part 222 extracts the differential data between the duplicate information and precedent backup data 251 and stores only the differential data in the hard disk 24.

Thus, the substrate processing system 10, according to the first embodiment, periodically stores the set information 151 for controlling the operation of the substrate processing apparatus 1 and the control programs 152 and 153 in the information storage server 2 connected with the substrate processing apparatus 1 through the network 6 as the backup data 251, so that the user need not perform complicated backup operations.

In particular, the substrate processing apparatus 1 has the recipe data 151*a* updated according to the user's know-how. The apparatus intrinsic data 151*c* adjusts the apparatus 1 while working the same on the actual set position, and hence it is important to periodically back up these data 151*a* and 151*c*, for preventing loss.

While the substrate processing apparatus 1 is set in a clean room, data stored by backup processing can be maintained outside of the clean room when the information storage server 2, connected through the network 6, is set outside the clean room.

While the user can manually perform the backup processing through the operation part 140 of the substrate processing apparatus 1, in this embodiment, the information server 2 may alternatively transmit an instructional command for the backup processing through the network 6. Thus, the instructional command for the backup processing can be transmitted from outside the clean room.

The information storage server need not necessarily be set in the substrate processing factory 4. Alternatively, a system management center may be set in the vicinity of the substrate processing factory 4 for transferring the backup data 251 through a private line.

According to the aforementioned processing, the information storage server 2 saves the backup data 251 of the set information 151, and the control programs 152 and 153, periodically or at arbitrary times.

The restore processing part 123 in the system control part 100 fetches the backup data 251 from the hard disk 24 for restoring the set information 151 and the control programs 152 and 153.

The set information 151 and the control programs 152 and 153 may be restored at any timing. For example, the set information 151 and the control programs 152 and 153 may be lost due to a hardware fault, or the user may erroneously lose data during maintenance operation. While the data are restored at abnormality restoration timing in this case, the user may request to return the set information 151 and the control programs 152 and 153 to past backup data.

For example, the user may request to return the recipe data 151*a* updated for operating the substrate processing apparatus 1 to previous recipe data 151*a*. Further, the user newly finely controlling the operation of the transfer robot TR and updating the teaching data may request to return the teaching data to the previous state.

In this case, the user inputs an instruction for restore processing through the operation part 140 of the substrate processing apparatus 1. More specifically, the user instructs restore processing by specifying information as to the data to be restored, the target of restoration and the like. Thus, the local instruction part 121 transmits a restore instructional command to the restore processing part 123. The restore processing part 123 refers to the backup data 251 stored in the hard disk 24 of the information storage server 2, extracts necessary information and performs restore processing.

When the set information 151 and the control programs 152 and 153 specified as the object of the restore processing are reserved as full data, the restore processing part 123 extracts the full data as such and stores the same in the storage part 104 of the system control part 100 or the storage part 114 of the unit control part 115.

When the set information 151 and the control programs 152 and 153 specified as the object of the restore processing are reserved as differential data, the restore processing part 123 extracts data obtained by accumulating full data backed up before the date of backup of the differential data and differential data from the date of backup of the full data and the specified date. Thus, the restore processing part 123 restores full data also as to the backup data 251 stored as differential data.

In the substrate processing system 10 according to the first embodiment, the information storage server 2 connected with each substrate processing apparatus 1 through the network 6 stores backed-up data, whereby restore operation can be readily performed through the network 6 also in the restore processing. Thus, the restore operation can be completed in a short time, thereby improving the working efficiency of the substrate processing apparatus 1.

As hereinabove described, the local instruction part 121 of the system control part 100 transmits a processing command thereby executing backup processing. The local instruction part 121 transmits the backup processing command according to the schedule function or when the user inputs an instruction through the operation part 140 of the substrate processing apparatus 1.

In the system structure according to the first embodiment, each support computer 3 of the support center 5 is connected to the substrate processing apparatus 1 through the wide area network 61, and it is also possible to execute backup processing by remote control from the support computer 3.

When a staff remote-controlling each substrate processing apparatus 1 inputs an instruction for backup processing in the support computer 3 in the support center 5, the remote instruction part 321 transmits a backup processing command through the network 6. When the backup processing command is transferred to the duplicate information acquisition part 122 in the substrate processing apparatus 1, processing similar to the above is performed.

When the support center 5 performs backup processing by remote control, a more hospitable user support system can be provided. The backup data 251 may be transferred to the support center 5.

2. Second Embodiment

A second embodiment of the present invention is now described. The overall schematic structure of a substrate processing system 10 according to the second embodiment is identical to that shown in FIG. 1. The hardware structure of a substrate processing apparatus 1 is identical to that of the first embodiment described with reference to FIGS. 2 and 3. The hardware structure each of an information storage server 2 and a support computer 3 is also identical to that of the first embodiment described with reference to FIG. 4.

Similarly to the first embodiment, the operation of the substrate processing apparatus 1 is controlled by control programs 152 and 153 stored in storage parts 104 and 114 according to the procedure of a previously described flow recipe. The control programs 152 and 153 control the substrate processing apparatus 1 according to set information 151 stored in the storage part 104.

The contents of the set information 151 are identical to those of the first embodiment shown in FIG. 5. However, apparatus basic data 151*b* include an extremely large number of data species in addition to those illustrated with reference to the first embodiment. While these are information initialized every substrate processing apparatus 1, the substrate processing apparatus 1 cannot perform planned operation when the contents of partial data are erroneously set among the large number of data. While it is possible to correct the operation of the substrate processing apparatus 1 with apparatus intrinsic data 151*c*, such correction is extremely complicated or impossible if the apparatus basic data 151*b* is not reliably set as basic information. The apparatus basic data 151*b* must be correctly set in the introduction or resetting of the substrate processing apparatus 1.

Figure 9:
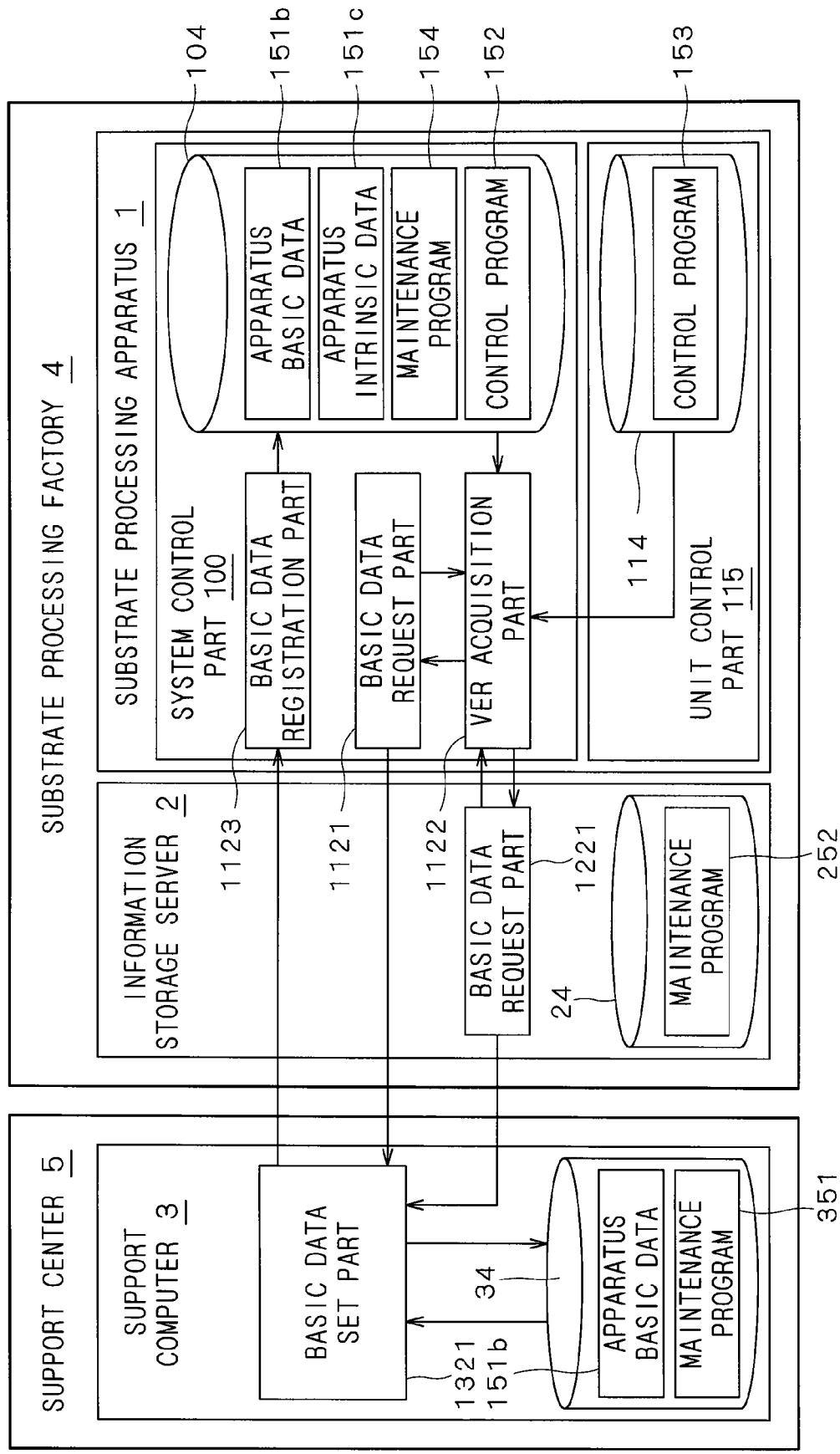
FIG. 9 is a block diagram showing the functional structure of a substrate processing system according to a second embodiment of the present invention.

FIG. 9 is a functional block diagram showing the functional structure of the substrate processing system 10 according to the second embodiment. Referring to FIG. 9, a CPU 101 of a system control part 100 runs a maintenance program 154 thereby implementing a basic data request part 1121, a version acquisition part 1122 and a basic data registration part 1123 as processing parts. The storage part 104 stores the maintenance program 154.

Referring to FIG. 9, a CPU 21 of the information storage server 2 runs a maintenance program 252 thereby implementing a basic data request part 1221 as a processing part. A hard disk 24 stores the maintenance program 252.

Referring to FIG. 9, a CPU 31 of the support computer 3 runs a maintenance program 351 thereby implementing a basic data set part 1321 as a processing part. A hard disk 34 stores the maintenance program 351.

The basic data request part 1121 is a functional part transmitting a transmission request for the apparatus basic data 151*b* from the substrate processing apparatus 1 to the support center 5. The user instructs acquisition of the apparatus basic data 151*b* through an operation part 140 provided on the substrate processing apparatus 1. In response to input of this instruction, the basic data request part 1121 requests the basic data set part 1321 of the support computer 3 to transmit the apparatus basic data 151*b*.

In order to simplify the input operation by the operator, a display part 130 may display a menu for acquiring the apparatus basic data 151*b*. When the input operation is enabled according to guidance, the burden on the operator can be reduced. If the support center 5 has a plurality of support computers 3 and the support computer 3, requested to transmit the apparatus basic data 151*b* is not fixed, the operator specifies the support computer 3 for transmitting the apparatus basic data 151*b* by input operation.

The version acquisition part 1122 is a functional part detecting the software version of the control program 152 controlling the overall substrate processing apparatus 1. While the substrate processing apparatus 1 requests the support computer 3 to transmit the apparatus basic data 151*b*, the set contents of the apparatus basic data 151*b* vary with the software version of the control program 152 controlling the substrate processing apparatus 1. Therefore, the substrate processing apparatus 1 posts the software version of the control program 152 therefor to the support computer 3, thereby requesting transmission of the apparatus basic data 151*b* corresponding to the software version.

The basic data request part 1221 comprised in the information storage server 2 also basically comprises a function similar to that of the basic data request part 1121 comprised in the substrate processing apparatus 1. When the operator inputs a request instruction for basic data through a keyboard 26*a* or a mouse 26*b* in the information storage server 2, the basic data request part 1221 transmits a transmission request instruction for the apparatus basic data 151*b*.

However, it is assumed that operation for specifying the substrate processing apparatus 1 registering the apparatus basic data 151*b* is performed when the information storage server 2 requests transmission of the apparatus basic data 151*b*. Thus, the information storage server 2 can transmit a transmission request for the apparatus basic data 151*b* as to all substrate processing apparatuses 1 set in substrate processing factory 4. The basic data request part 1221 requests acquisition of the software version to the version acquisition part 1122 of the substrate processing apparatus 1 through a LAN 41. Thus, the basic data request part 1221 transmits the transmission request for the apparatus basic data 151*b* to the support computer 3, after specifying the software version.

Figure 10:
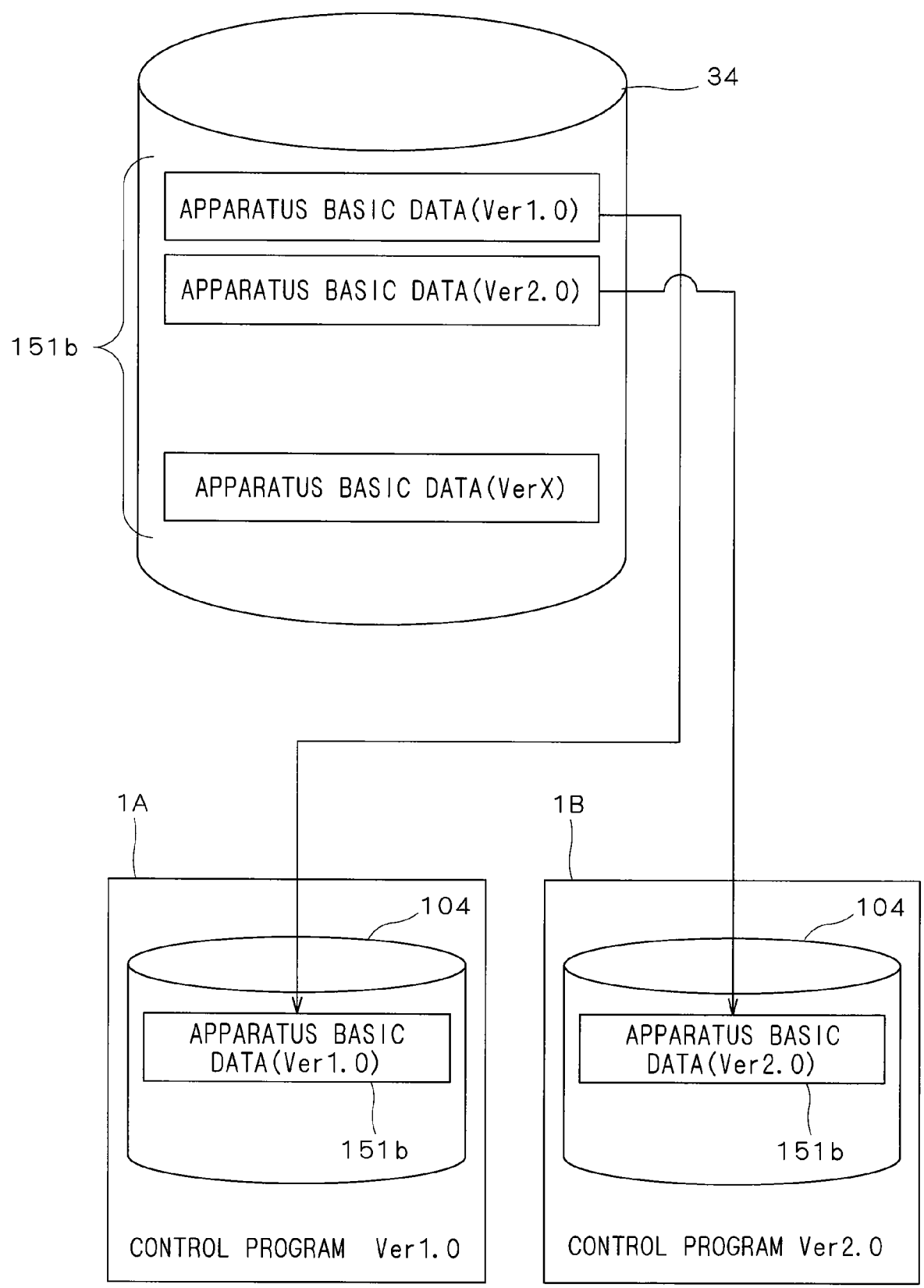
FIG. 10 illustrates apparatus basic data of versions managed in a support computer according to the second embodiment.

FIG. 10 shows apparatus basic data 151*b* of various versions stored in the hard disk 34 of the support computer 3. The version of each apparatus basic data 151*b* corresponds to the software version of the control program 152 for the substrate processing apparatus 1.

The apparatus basic data 151*b* is managed in correspondence to the software version of the control program 152 controlling the overall substrate processing apparatus 1 according to the second embodiment, apparatus basic data corresponding to the control program 153 controlling each processing unit may also be managed. In this case, the version acquisition part 1122 of the system control part 100 also detects version information of the control program 153 stored in the storage part 114 of a unit control part 115.

When receiving a transmission request instruction for the apparatus basic data 151*b* from the basic data request part 1121 (or the basic data request part 1221), the basic data set part 1321 of the support computer 3 acquires the software version of the control program 152 included in the data of the transmission request instruction and extracts the apparatus basic data 151b corresponding to this software version from the hard disk 34. The basic data set part 1321 transmits the extracted apparatus basic data 151b to the substrate processing apparatus 1.

In the substrate processing apparatus 1, the basic data registration part 1123 receives the apparatus basic data 151b transmitted from the support computer 3 and stores the same in the storage part 104. Thus, it follows that the substrate processing apparatus 1 is initialized in correspondence to the control program 152 for this substrate processing apparatus 1.

FIG. 10 shows a state where a substrate processing apparatus 1A installed with a control program 152 of a version 1.0 stores apparatus basic data (Ver1.0) and a substrate processing apparatus 1B installed with a control program 152 of a version 2.0 stores apparatus basic data (Ver2.0).

Thus, the substrate processing system 10 according to the second embodiment can readily acquire the apparatus basic data 152b which is basic information for controlling the substrate processing apparatus 1 through a network and reflect the same on the substrate processing apparatus 1, whereby it follows that stable initialization operation can be performed on the same substrate processing apparatus 1 controlled by the same software version. Also when performing initialization operation on a plurality of substrate processing apparatuses 1 controlled by the same software version, the substrate processing apparatuses 1 are initialized identically to each other. In other words, initialized states of a plurality of substrate processing apparatuses 1 can be synchronized with each other. Thus, it is possible to completely avoid dispersion in setting between the apparatuses 1 caused when the operator manually copies the apparatus basic data 151b.

After the apparatus basic data 151b is registered in each substrate processing apparatus 1, each substrate processing apparatus 1 performs intrinsic tuning. It follows that each substrate processing apparatus 1 is optimally controlled according to the apparatus basic data 151b received from the support computer 3 and the apparatus intrinsic data 151c created every apparatus 2.

The support computer 3 determines the software version of the control program 152 installed in the substrate processing apparatus 1 thereby transmitting the proper apparatus basic data 151b in the second embodiment. It is possible to transmit apparatus basic data 151b responsive to the types of respective substrate processing apparatuses 1 also when different substrate processing apparatuses 1 are present in combination if each substrate processing apparatus 1 posts the type thereof as information to the support computer 3.

While the support computer 3 manages the apparatus basic data 151b set in common for the substrate processing apparatuses 1 in the second embodiment, the support computer 3 may alternatively manage the apparatus intrinsic data 151c. While the apparatus intrinsic data 151c is information intrinsic to each apparatus 1 as described above and hence the data 151c may not necessarily be directly utilizable in another apparatus, the user can use apparatus intrinsic data 151c set for a certain substrate processing apparatus 1 as know-how for another apparatus 1.

While the version acquisition part 1122 comprised in the system control part 100 automatically detects the software version of the control program 152 in the second embodiment, this functional part is not essential. As hereinabove described, the user may specify the software version of the apparatus 1 when inputting the transmission request instruction for the apparatus basic data 151b through the operation part 140. In order to avoid an artificial error, however, it is more preferable that the version acquisition part 1122 automatically detects the software version.

3. Third Embodiment

Figure 11:
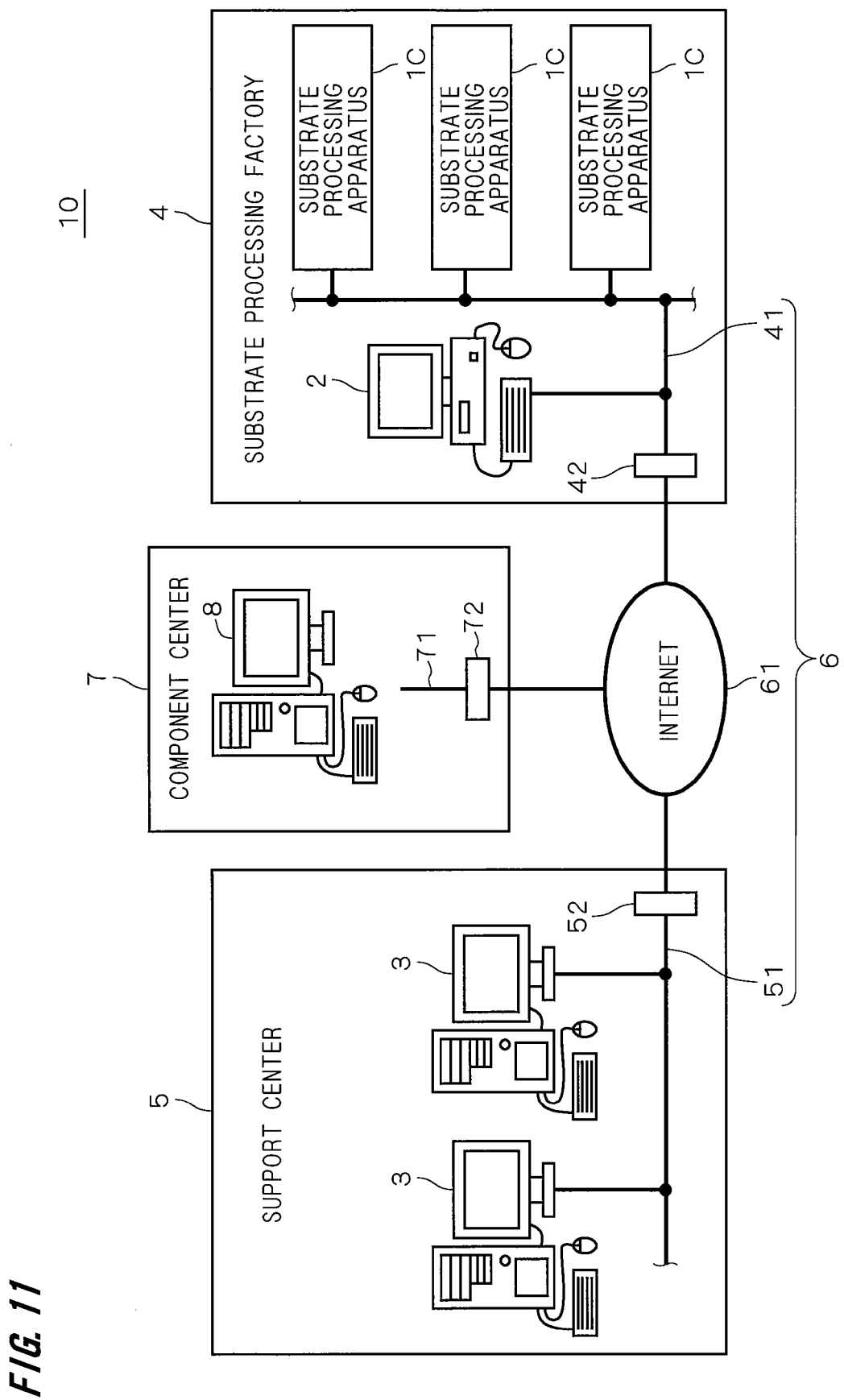
FIG. 11 schematically illustrates the structure of a substrate processing system according to a third embodiment of the present invention.

A third embodiment of the present invention is now described. FIG. 11 schematically illustrates the structure of a substrate processing system 10A according to the third embodiment. As shown in FIG. 11, the substrate processing system 10A has such a structure that a plurality of processing apparatuses 1C and an information storage server 2 comprised in a substrate processing factory 4, support computers 3 comprised in a support center 5 where support staffs for the substrate processing apparatuses 1C are posted and an order acceptance server 8 in a component center 7 supplying components of the substrate processing apparatuses 1 to the substrate processing factory 4 are connected with each other through a network 6.

In the substrate processing system 10A, the information storage server 2 accumulates utilization consumption or deteriorating use information described as utilization consumption of consumables (hereinafter the term "components" indicates consumables) mounted on the substrate processing apparatuses 1C, so that the support computers 3 can read the stored utilization consumption information through the network 6. The order acceptance server 8 accepts orders for components through the network 6.

In the substrate processing factory 4, the substrate processing apparatuses 1C and the information storage server 2 are connected with each other through a LAN (local area network) 41. The LAN 41 is connected to a wide area network 61 such as the Internet through a connector 42 having functions of a router, a firewall and the like. The support center 5 also has a LAN 51 connected with the support computers 3, and this LAN 51 is also connected to the wide area network 61 through a connector 52 having functions of a router, a firewall and the like. The component center 7 also has a LAN 71 connected with the order acceptance server 8, and this LAN 71 is also connected to the wide area network 61 through a connector 72 having functions of a router, a firewall and the like. Thus, various data communication can be made between the substrate processing apparatuses 1C, the information storage server 2, the support computers 3 and the order acceptance server 8. Throughout the specification, the LANS 41, 51 and 71 and the wide area network 61 are generically referred to as a network 6.

Referring to FIG. 11, the substrate processing factory 4 comprising the plurality of substrate processing apparatuses 1C may alternatively comprise a single substrate processing apparatus 1C, and the support center 5 comprising the plurality of support computers 3 may also alternatively comprise a single support computer 3. Further, the component center 7 may alternatively comprise a plurality of order acceptance servers 8.

Figure 12:
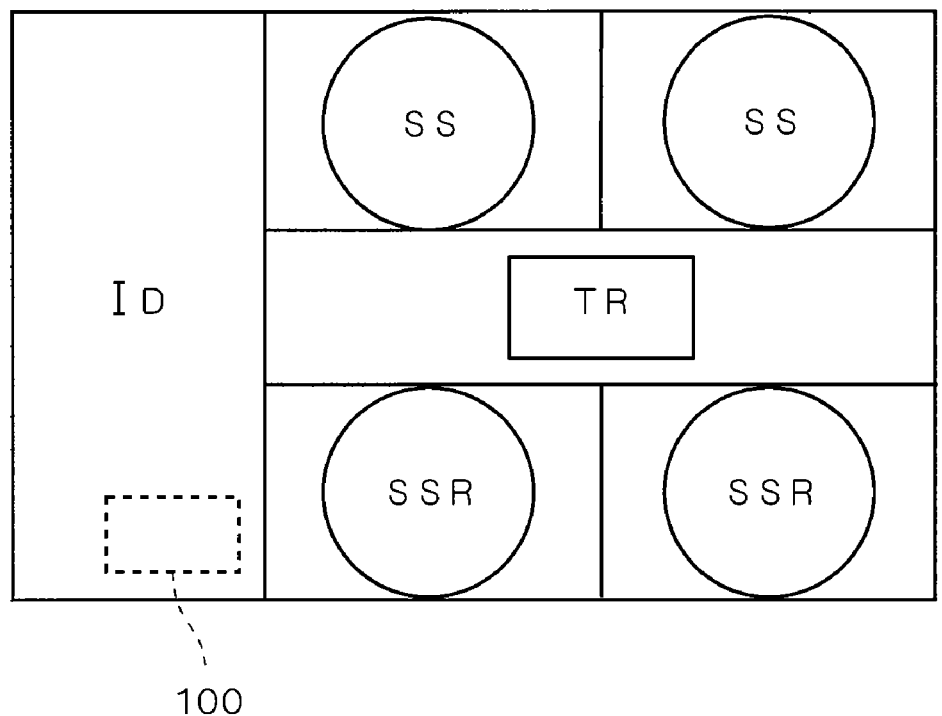
FIG. 12 is a schematic plan view of a substrate processing apparatus according to the third embodiment.

Each of the substrate processing apparatuses 1C arranged on the substrate processing factory 4 is now described. FIG. 12 is a schematic plan view of the substrate processing apparatus 1C. This substrate processing apparatus 1C cleans front and back surfaces of substrates. The substrate processing apparatus 1C comprises an indexer ID delivering unprocessed substrates from a carrier while receiving processed substrates and storing the same in the carrier. Surface cleaning processing units SS bring cleaning brushes into contact with the surfaces of the substrates or approaching the former to the latter while rotating the substrates, thereby performing surface cleaning processing, back surface cleaning processing units SSR bring cleaning brushes into contact with the back surfaces of the substrates or cause approaching the former to the latter while rotating the substrates thereby performing back surface cleaning processing. A transfer robot TR transfer the substrates between the indexer ID and each cleaning processing unit. The substrate processing apparatus 1C also comprises a surface inversion unit (not shown).

Figure 13:
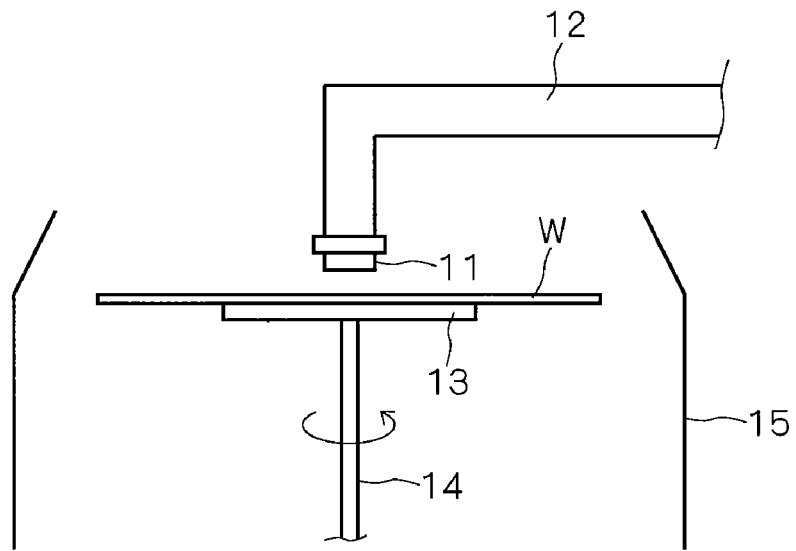
FIG. 13 schematically illustrates the structure of a surface cleaning processing unit of the substrate processing apparatus shown in FIG. 12.

FIG. 13 schematically illustrates the structure of each surface cleaning processing unit SS. The surface cleaning processing unit SS is the so-called spin scrubber. A spin chuck 13 is the so-called vacuum chuck vacuum-sucking the back surface of a substrate W thereby horizontally holding the substrate W. A motor shaft 14 of an electric motor (not shown) is suspended on the center of the lower surface of the spin chuck 13. The electric motor rotates the spin chuck 13 through the motor shaft 14, thereby rotating the substrate W held by the same.

A cup 15 is arranged around the substrate W for receiving and recovering a processing solution scattered from the rotated substrate W. The cup 15 is vertically movable by a hoist mechanism (not shown). When the hoist mechanism moves the cup 15 downward, the upper end of the cup 15 is located downward beyond the spin chuck 13. In this state, the transfer robot TR can introduce and discharge the substrate W into and from the spin chuck 13. When moved upward, the cup 15 encloses the substrate W held by the spin chuck 13 while the upper end of the cup 15 is located upward beyond the substrate W. The substrate W is cleaned while the cup 15 is moved upward.

A cleaning brush 11 is mounted on the forward end of a brush arm 12. The brush arm 12 is vertically movable and swingable in a horizontal plane through a driving mechanism (not shown). When performing surface cleaning processing on the substrate W, the brush arm 12 is swung while bringing the cleaning brush 11 into contact with the surface of the substrate W or approaching the former to the latter and rotating the substrate W, thereby removing contaminants such as particles adhering to the surface of the substrate W. Each back surface cleaning processing unit SSR, which is substantially similar in structure to the surface cleaning processing unit SS, employs the so-called mechanical chuck grasping an edge of the substrate W thereby horizontally holding the substrate W as a spin chuck 13. In the third embodiment, the surface cleaning processing units SS and the back surface cleaning processing units SSR are generically referred to as processing units 110 performing prescribed processing on substrates.

Figure 14:
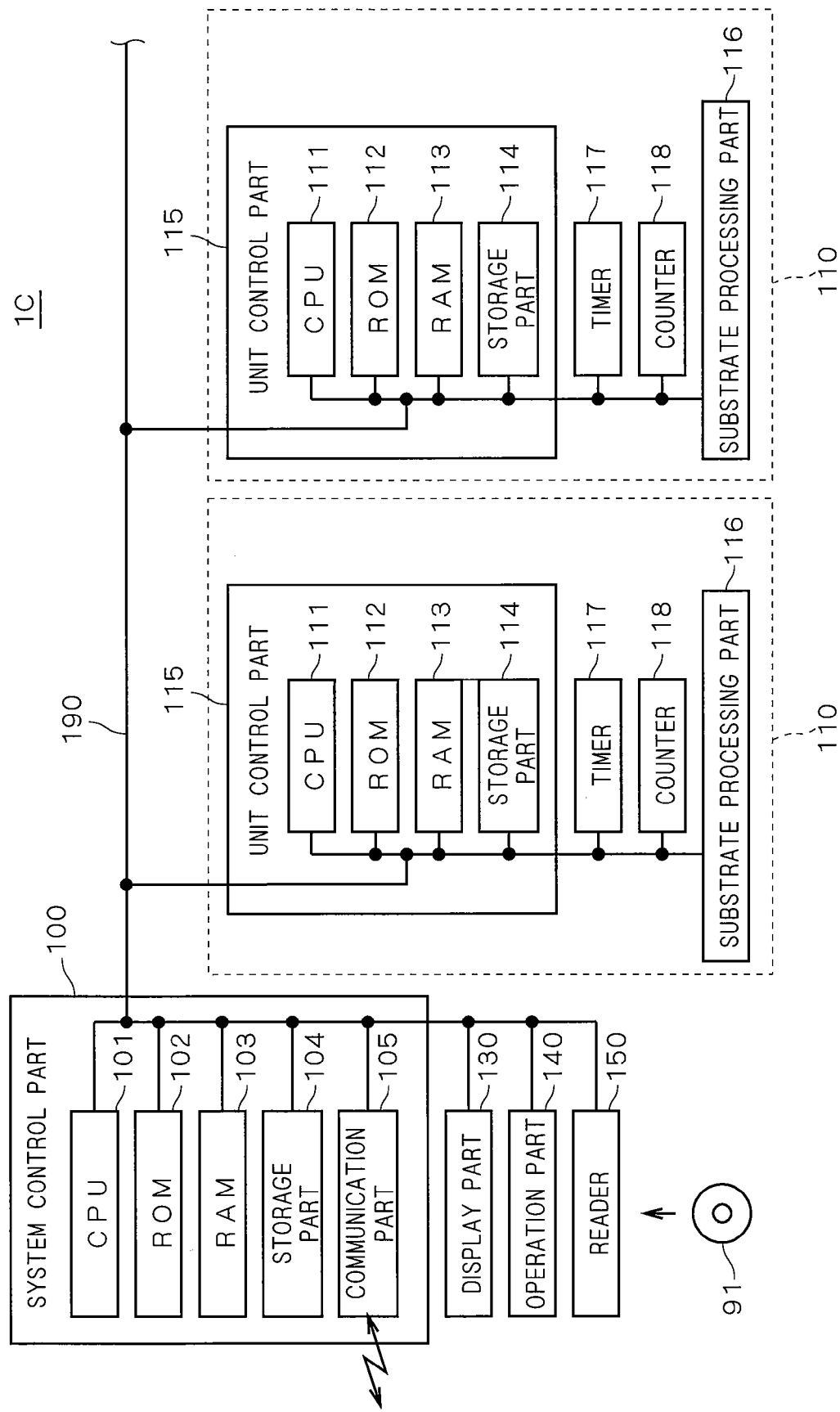
FIG. 14 is a block diagram showing the structure of a control system for the substrate processing apparatus according to the third embodiment.

FIG. 14 is a block diagram showing the structure of a control system for the substrate processing apparatus 1C. As shown in FIG. 14, the control system for the substrate processing apparatus 1C is formed by a system control part 100 controlling the overall apparatus 1C and unit control parts 115 individually controlling a plurality of processing units 110.

The system control part 100 controlling the overall apparatus 1C in a unific manner comprises a microcomputer. More specifically, the system control part 100 comprises a CPU 101 serving as a body part, a ROM 102 serving as a read-only memory storing a basic program and the like, a RAM 103 serving as a random-access memory mainly defining an arithmetic working area, a storage part 104 consisting of a hard disk or the like storing a software module and the like and a communication part 105 performing data communication with an external device, which are connected with each other by a bus line 190.

The communication part 105 is connected to the network 6 through a network interface (not shown), so that the substrate processing apparatus 1C can transmit/receive various data to/from the information storage server 2, the support computers 3 and the like. While the communication part 105 may perform either wire communication or radio communication through the network 6, a wire communication system is employed in this embodiment.

Together with the system control part 100 and the plurality of processing units 110, there is a display part 130 displaying various information, an operation part 140 accepting input operation of a recipe and command operation from an operator. A reader 150 reading various data from a recording medium 91 such as a magnetic disk or a magnetooptic disk and the like is also electrically connected to the bus line 190. Thus, data can be transferred between the respective parts of the substrate processing apparatus 1C through the bus line 190 under control of the system control part 100.

Each processing unit 110 comprises the unit control part 115 along with a substrate processing part 116 serving as a working part (for example, a mechanism rotating substrates, a mechanism discharging a processing solution to the substrates, a mechanism driving the cleaning brush 11 or the like) processing the substrates in practice. The unit control part 115, individually controlling the processing unit 110, controls and monitors operation of the substrate processing part 116 of the processing unit 110 provided with this unit control part 115. In other words, the aforementioned system control part 100 takes charge of unified control on the overall substrate processing apparatus 1C, while each unit control part 115 takes charge of control responsive to the processing contents of each substrate processing part 116. The unit control part 115 comprises a microcomputer similarly to the system control part 100. More specifically, the unit control part 115 comprises a CPU 111 serving as the body part, a ROM 112 serving as a read-only memory storing a basic program and the like, a RAM 113 serving as a random-access memory defining an arithmetic working area and a storage part 114 consisting of an SRAM backed up with a battery for storing various data.

Each processing unit 110 is further provided with a timer 117 and a counter 118. The timer 117 has a function of measuring the used time (time used for substrate processing after exchange to a new cleaning brush 11) of the component, such as the cleaning brush 11 of the processing unit 110. When the processing unit 110 is provided with a plurality of components, the timer 117 measures the used time every component. The counter 118 has a function of counting the number of substrates (the number of substrates processed after exchange to a new cleaning brush 11) processed with the component, such as the cleaning brush 11 of the processing unit 110. When the processing unit 110 is provided with a plurality of components, the counter 118 measures the number of processed substrates every component.

The ROM 102 and the storage part 104 of the system control part 100 previously store system control programs related to the overall apparatus 1C. When the CPU 101 of the system control part 100 executes arithmetic processing according to the system control programs, it follows that operation control and data processing are implemented on the overall substrate processing apparatus 1C. The ROM 112 and the storage part 114 of the unit control part 115 previously store unit control programs responsive to the processing contents of the substrate processing part 116 of this processing unit 110. When the CPU 111 of the unit control part 115 executes arithmetic processing according to the unit control programs, it follows that operation control and data processing are implemented on the substrate processing part 116.

These programs can be acquired and updated by reading from the recording medium 91 through the reader 150 or downloading from a prescribed server memory or the like through the network 6. Each program has a version, and version information such as a numerical value for identifying the version is changed when the program is updated. The storage part 104 of the system control part 100 stores the version information of each program run by the substrate processing apparatus 1C.

Figure 15:
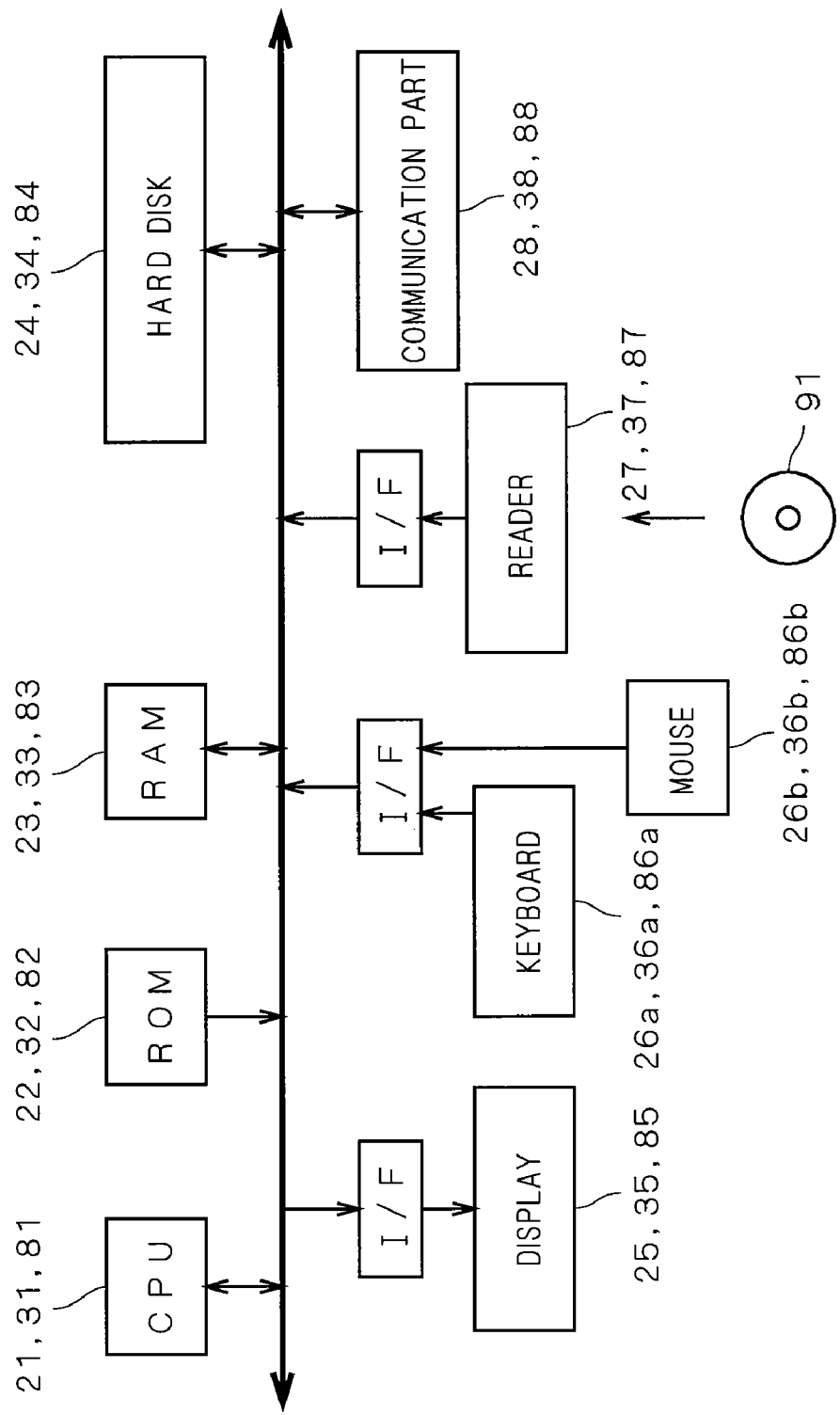
FIG. 15 illustrates the basic structure of an information storage server, a support computer or an order acceptance server.

The information storage server 2 arranged on the substrate processing factory 4, each support computer 3 arranged on the support center 5. The order acceptance server 8 arranged on the component center 7 are now described. The information storage server 2, the support computer 3 and the order acceptance server 8 are similar in hardware structure to a general computer. Each of the basic structures of the information storage server 2, the support computer 3 and the order acceptance server 8, which are similar to each other, is described with reference to FIG. 15. As shown in FIG. 15, each of the information storage server 2, the support computer 3 and the order acceptance server 8 is formed by connecting a CPU 21, 31 or 81 (the CPU 21 for the information storage server 2, the CPU 31 for the support computer 3 and the CPU 81 for the order acceptance server 8: this also applies to the following description), a ROM 22, 32 or 82 storing the basic program and a RAM 23, 33 or 83 storing various information to a bus line. A hard disk 24, 34 or 84 storing various information, a display 25, 35 or 85 displaying various information, a keyboard 26a, 36a or 86a and a mouse 26b, 36b or 86b accepting input from the operator, a reader 27, 37 or 87 reading various data from the recording medium 91 such as an optical disk, a magnetic disk or a magnetooptical disk and a communication part 28, 38 or 88 making communication with the external device through the network 6 are also connected to the bus line properly through interfaces (I/F) or the like.

Each of the information storage server 2, the support computer 3 and the order acceptance server 8 can read a program from the recording medium 91 through the reader 27, 37 or 87 and store the same in the hard disk 24, 34 or 84. Each of the information storage server 2, the support computer 3 and the order acceptance server 8 can also download a program from another server through the network 6 and store the same in the hard disk 24, 34 or 84. The CPU 21, 31 or 81 executes arithmetic processing according to the program stored in the hard disk 24, 34 or 84 for performing operation. In other words, it follows that the information storage server 2 performs operation as the information storage server 2, the support computer 3 performs operation as the support computer 3 and the order acceptance server 8 performs operation as the order acceptance server 8 as a result of executing arithmetic operation according to the program.

Figure 16:
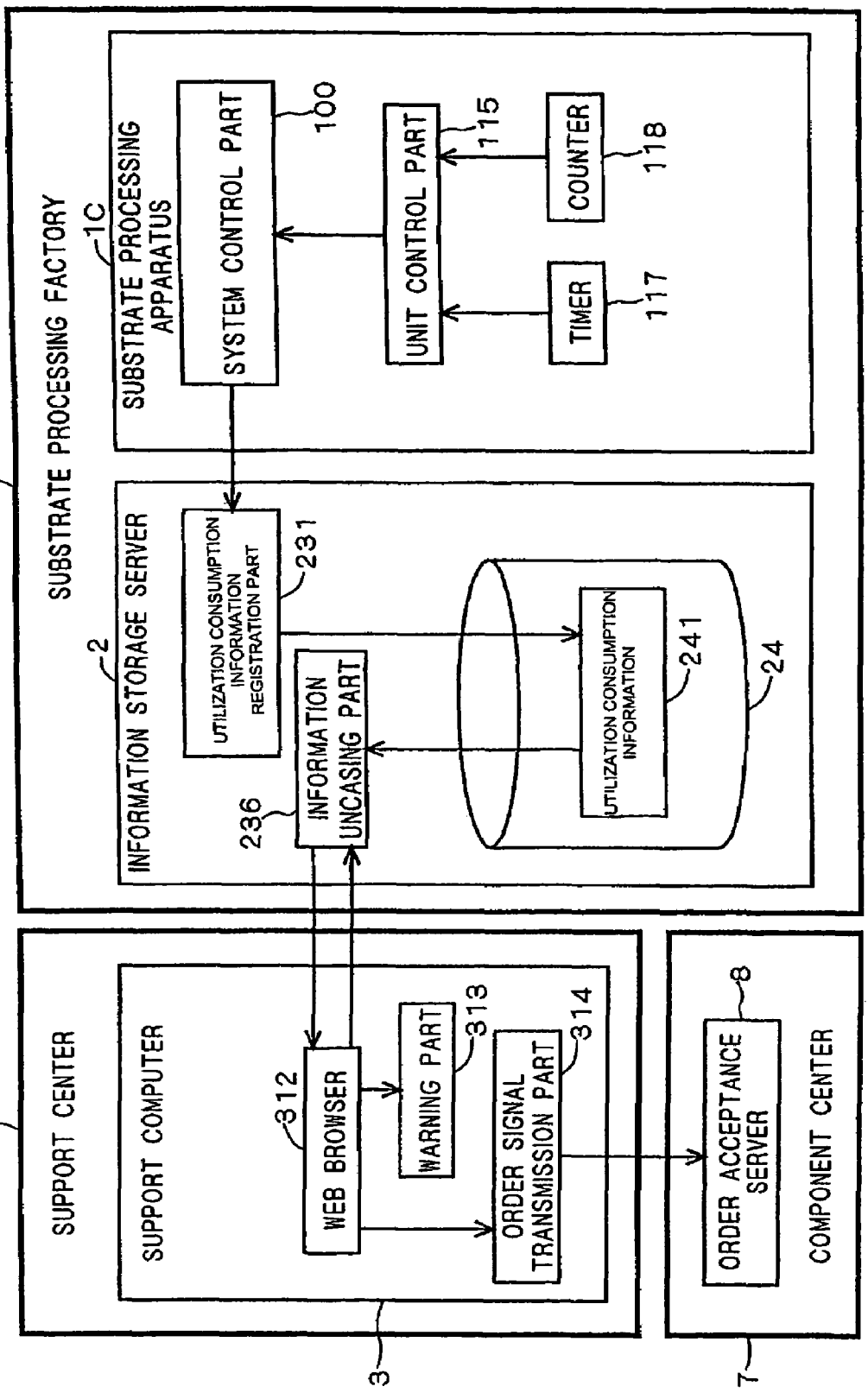
FIG. 16 is a functional block diagram showing the functional structure of the substrate processing system according to the third embodiment.
Figure 17:
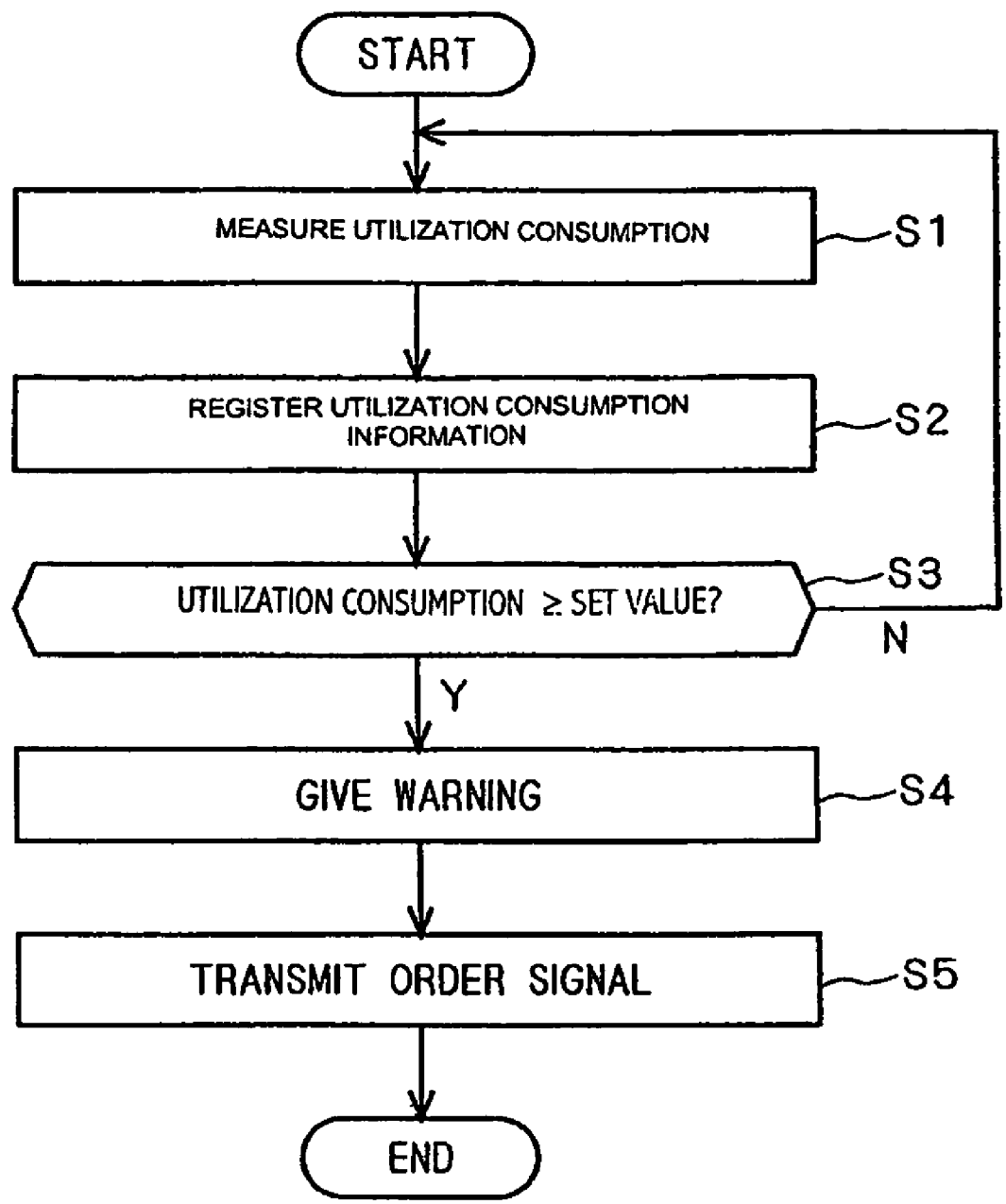
FIG. 17 is a flow chart showing the procedure in the substrate processing system according to the third embodiment.

While the hardware structures of the substrate processing system 10A and the substrate processing apparatus 1C, the information storage server 2, the support computer 3 and the order acceptance server 8 forming the same have been described, the function and the processing contents of the substrate processing system 10A are now described. FIG. 16 is a functional block diagram showing the functional structure of the substrate processing system 10A. FIG. 17 is a flow chart showing the procedure in the substrate processing system 10A. Referring to FIG. 16, the CPU 21 of the information storage server 2 runs processing programs thereby implementing a utilization consumption information registration part 231 and an information uncasing part 236 as processing parts respectively, and the CPU 31 of the support computer 3 runs processing programs thereby implementing a WEB browser 312, a warning part 313 and an order signal transmission part 314 as processing parts respectively.

At a step S1 in FIG. 17, utilization consumption of a component of the substrate processing apparatus 1C is measured.

The utilization consumption is measured of every processing unit 110. According to this embodiment, the timer 117 measures the used time of the component such as the cleaning brush 11 as the utilization consumption. The unit control part 115 collects the measured utilization consumption of every processing unit 110 and transmits the same to the system control part 100. The system control part 100 collects the measured utilization consumption of every substrate processing unit 1C and transmits the utilization consumption of each component of the substrate processing apparatus 1C to the utilization consumption information registration part 231 of the information storage server 2 from the communication part 105 through the LAN 41.

Then, the process advances to a step S2 in FIG. 17, so that the utilization consumption information registration part 231 registers the utilization consumption of each component of the substrate processing apparatus 1C in the hard disk 24. The hard disk 24 cumulatively stores the utilization consumption every component of each substrate processing apparatus 1C as utilization consumption information 241.

FIG. 18 illustrates exemplary utilization consumption information 241. Referring to FIG. 18, the column of "apparatus" shows identification numbers assigned to the respective substrate processing apparatuses 1C, the column of "component" shows the names of the consumables, and the columns of "used time" and "number of processed substrates" show the utilization consumption. This embodiment employs the used time as the utilization consumption, and hence the utilization consumption information 241 describes no number of processed substrates. As shown in FIG. 18, the utilization consumption information 241 accumulates the utilization consumption of every component as to each of the substrate processing apparatuses 1C arranged on the substrate processing factory 4. As to a substrate processing apparatus 1C having an apparatus number "8101", for example, the utilization consumption information 241 records that the used time of a cleaning brush 11 provided with a name "brush 2" is 12 hours. The timer 117 measures the used time of each component at a constant interval and the utilization consumption information registration part 231 sequentially registers the result of measurement in the hard disk 24 thereby constructing the utilization consumption information 241.

The information uncasing part 236 uploads the utilization consumption information 241 accumulated in the hard disk 24 of the information storage server 2 to be readable through the network 6. The staff at the support center 5 can read the utilization consumption information 241 by acquiring the utilization consumption information 241 accumulated in the hard disk 24 from the information uncasing part 236 through the WEB browser 312 and displaying the same on the display 35 for confirming the utilization consumption of each component of the substrate processing apparatus 1C arranged on the substrate processing factory 4. Thus, the support center 5 can efficiently manage the utilization consumption of each component of the substrate processing apparatus 1C. The utilization consumption information 241 is regularly acquired through the WEB browser 312.

The CPU 31 of the support computer 3 determines whether or not the utilization consumption of the component of the substrate processing apparatus 1C is in excess of a previously set prescribed value on the basis of the utilization consumption information 241 acquired through the WEB browser 312 (step S3). The CPU 31 makes this determination every component registered in the consumptiveness information 241, i.e., every component of the plurality of substrate processing apparatuses 1C. When the utilization consumption of any component exceeds the previously set prescribed value, i.e., when the used time exceeds the prescribed value, the process advances to a step S4 so that the warning part 313 gives a warning for prompting exchange of the component.

In other words, the warning part 313 gives the warning for prompting exchange of the component when the utilization consumption of the component accumulated in the hard disk 24 reaches the prescribed value. The warning can be displayed on the display 35 or given as a sound, for example.

The staff for maintaining the substrate processing apparatus 1C can recognize that the component approaches the end of its life through the warning for prompting exchange.

When the utilization consumption of any component is in excess of the previously set prescribed value, the process advances to a step S5 so that the order signal transmission part 314 transmits an order signal for a new component to the order acceptance server 8 in the third embodiment. When the utilization consumption of the component accumulated in the hard disk 24 reaches the prescribed value, the order signal transmission part 314 transmits the order signal for the new component for exchanging for this component to the order acceptance server 8.

When the order acceptance server 8 receives the order signal, the component center 7 immediately progresses processing of supplying the new component to the substrate processing factory 4. The steps S4 and S5 may be replaced with each other in order, or may be simultaneously carried out.

According to the third embodiment, it follows that a new component is already prepared in the substrate processing factory 4 when any component of the substrate processing apparatus 1C is consumed or broken, whereby the component can be immediately exchanged and the stop time of the substrate processing apparatus 1C following this component exchange can be minimized so that the apparatus 1C can be inhibited from remarkable reduction of working efficiency.

As the aforementioned prescribed value, therefore, it is preferable to set a value immediately before the component is consumed to an unusable state as a value requiring exchange. When any component becomes unusable after a lapse of a used time of 100 hours, for example, the period of 90 hours is set as the value requiring exchange. The life of each component may be experimentally obtained for calculating the value requiring exchange, or the value requiring exchange may be stochastically obtained from the utilization consumption information 241 accumulated in the aforementioned manner. More specifically, the utilization consumption information 241 records utilization consumption of every component, so that utilization consumption can be made known when the component becomes unusable. The life of each component can be obtained by knowing utilization consumption levels leading to unusable states as to a plurality of components and stochastically processing the same, so that the value (value requiring exchange) immediately before the component is consumed to an unusable state can be determined.

While the information storage server 2 is arranged in the substrate processing factory 4 in the third embodiment, the present invention is not restricted to this. The information storage server 2 may be arranged anywhere so far as the same is connected to the network 6 to be capable of making communication with the substrate processing apparatus 1C and the support computer 3.

While both of warning and transmission of the order signal are performed when the utilization consumption of any component is in excess of the previously set prescribed value in the third embodiment, only one may be performed. When only warning is performed the support staff of the support center 5 recognizing that any component approaches the end of its life orders a new component to the component center 7 with e-mail or the like. Hereafter, a new component is prepared in the substrate processing factory 4 when the component of the substrate processing apparatus 1C is consumed or broken, whereby the component can be immediately exchanged and the substrate processing apparatus 1C can be prevented from excessive reduction of working efficiency.

Neither warning nor transmission of the order signal may be performed. In this case, the support staff of the support center 5 monitoring the utilization consumption information 241 determines the exchange period and orders a new component to the component center 7 by e-mail or the like.

While the utilization consumption information 241 is configured so that the support computer 3 determines whether or not the utilization consumption of any component is in excess of the previously set prescribed value (value requiring exchange) in the third embodiment, the system control part 100 of the substrate processing apparatus 1C may alternatively directly transmit the utilization consumption of the component to the support computer 3 without constructing the utilization consumption information 241.

While the used time is employed as the utilization consumption in the third embodiment, the number of processed substrates may alternatively be employed as the utilization consumption. When the number of processed substrates is employed as the utilization consumption, the counter 118 measures the number of substrates processed with any component such as the cleaning brush 11 as the utilization consumption. Handling of the measured utilization consumption is identical to that of the aforementioned used time. Also in this case, an effect similar to that in the case of employing the used time as the utilization consumption can be attained. Further alternatively, both of the used time and the number of processed substrates may be employed as the utilization consumption. In this case, warning may be given or an order signal for a new component may be transmitted when either the used time or the number of processed substrates is in excess of the previously set prescribed value.

Figure 19:
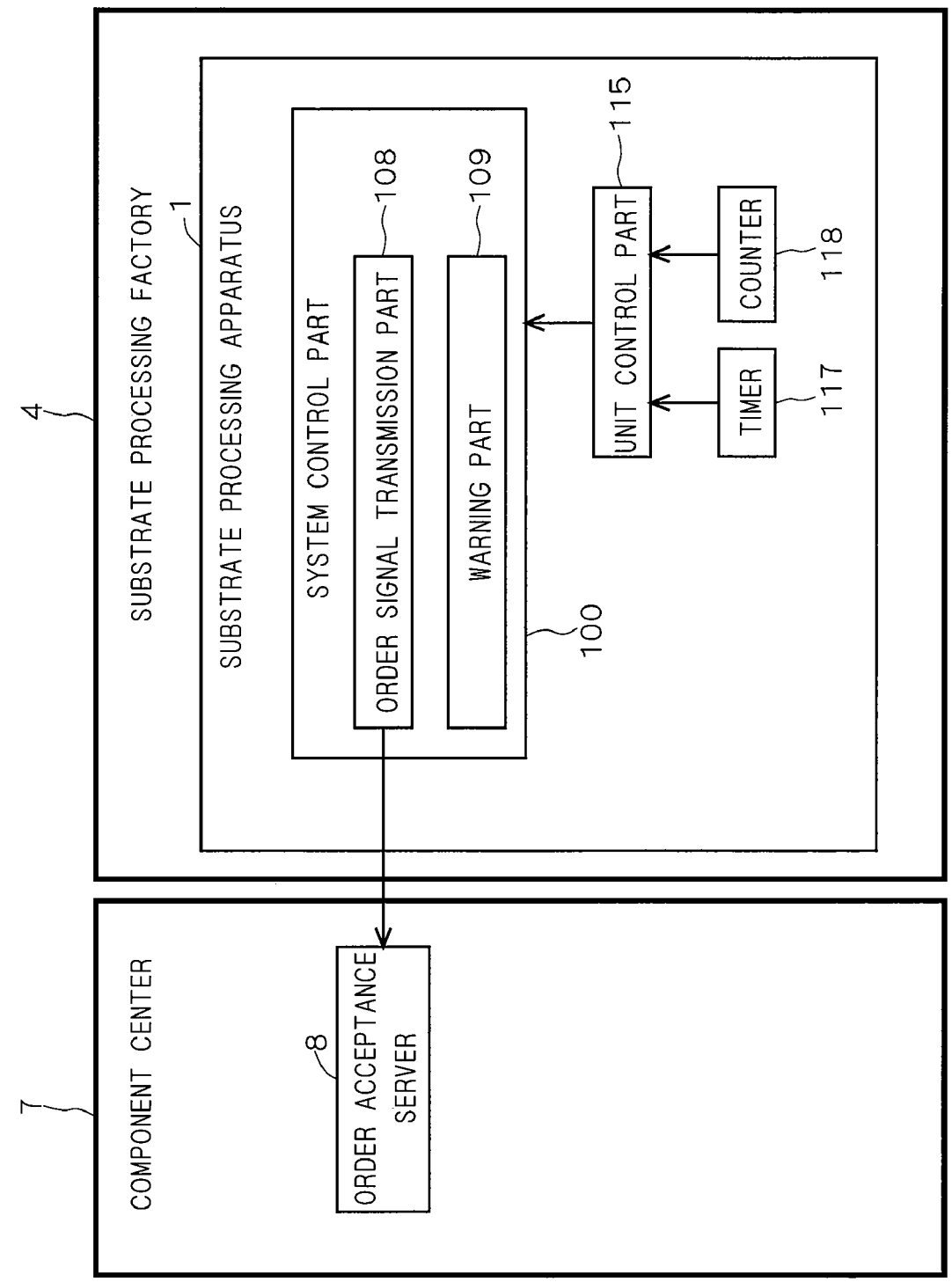
FIG. 19 is a functional block diagram showing the functional structure of another substrate processing system according to the third embodiment provided with a substrate processing apparatus having a warning function and a function of transmitting a component order signal.

Further, instead of not the support computer 3 the substrate processing apparatus 1C or the information storage server 2 may have the warning function and the function of transmitting an order signal for a new component. FIG. 19 is a functional block diagram showing the functional structure of a substrate processing system 10A provided with a substrate processing apparatus 1C having a warning function and a function of transmitting a component order signal. Referring to FIG. 19, elements having the same functions as those in FIG. 16 are denoted by the same reference numerals. Referring to FIG. 19, a CPU 101 of a system control part 100 runs processing programs thereby implementing an order signal transmission part 108 and a warning part 109 as processing parts having roles identical to those of the order signal transmission part 314 and the warning part 313 shown in FIG. 16 respectively.

In this case, the system control part 100 (in a strict sense, the CPU 101) determines whether or not utilization consumption measured by a timer 117 or a counter 118 is in excess of a previously set prescribed value (value requiring exchange) so that the warning part 109 gives warning from a display part 130 or the like. Alternatively, the order signal transmission part 108 transmits an order signal for a new component from a communication part 105 to an order acceptance server 8 through a network 6. An effect similar to that of the third embodiment can be also attained in this case.

While it is assumed that the substrate processing apparatus 1C performs cleaning processing on substrates and the utilization consumption of the cleaning brush 11 forming the same is managed in the third embodiment, the present invention is not restricted to this but the technique according to the present invention can be applied also to a case such as managing utilization consumption of a lamp forming a lamp annealing apparatus heating substrates by photoirradiation. Further, the technique according to the present invention is also applicable to a case of managing utilization consumption of a belt, cylinder, a motor or the like for driving the transfer robot TR as a consumable.

4. Fourth Embodiment

A fourth embodiment of the present invention is now described. The overall structure of a substrate processing system 10 according to the fourth embodiment is identical to that shown in FIG. 1. In the substrate processing system 10 according to the fourth embodiment, however, each support computer 3 distributes educational information related to operation of each substrate processing apparatus 1 to the substrate processing apparatus 1 through a network 6, and a staff delivering a lecture on the operation of the substrate processing apparatus 1 is posted at a support center 5.

The hardware structure of the substrate processing apparatus 1 is identical to that in the first embodiment described with reference to FIGS. 2 and 3. Further, the hardware structure of each of an information server 2 and the support computer 3 is also identical to that in the first embodiment described with reference to FIG. 4.

Figure 20:
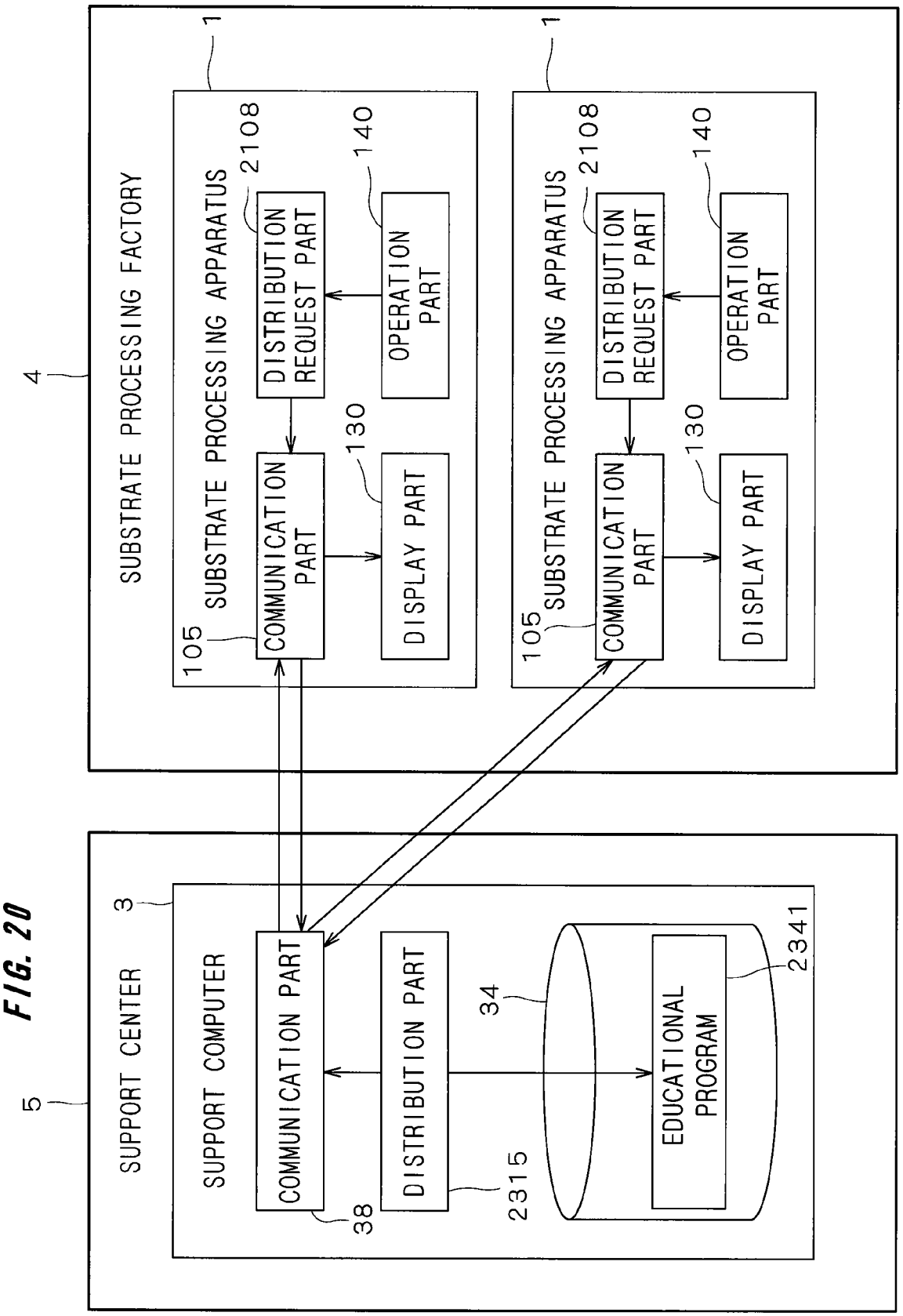
FIG. 20 is a functional block diagram showing an exemplary functional structure of a substrate processing system according to a fourth embodiment of the present invention.

FIG. 20 is a functional block diagram showing the functional structure of the substrate processing system 10 according to the fourth embodiment. Referring to FIG. 20, a CPU 101 of a system control part 100 runs a control program thereby implementing a distribution request part 2108 as a processing part, and a CPU 31 of the support computer 3 runs a control program thereby implementing a distribution part 2315 as a processing part.

A hard disk 34 comprised in the support computer 3 of the support center 5 stores an educational program 2341. The CPU 31 of the support center 3 reads and runs the educational program 2341, so that the distribution part 2315 can distribute educational information related to operation of each substrate processing apparatus 1 of a substrate processing factory 4 from a communication part 38 through a network 6. The technique of streaming distribution, for example, may be employed as the mode of distribution. A communication part 105 receives the educational information distributed from the support computer 3 and displays the same on a display part 130.

As to the timing of distribution, educational information may be simultaneously be distributed to a plurality of substrate processing apparatuses 1 arranged on a certain substrate processing factory 4 regardless of presence/absence of distribution requests from the substrate processing apparatuses 1, or may be distributed only to a substrate processing apparatus 1 presenting a distribution request. More specifically, the distribution request part 2108 transmits a distribution request to the support computer 3 from the communication part 105 through the network 6 when a distribution request command is input from an operation part 140. The distribution part 2315 of the support computer 3 receiving the distribution request distributes the educational information to the substrate processing apparatus 1 from the communication part 38 through the network 6.

In a case of simultaneously delivering a lecture on operation explanation to a large number of operators of the substrate processing factory 4, educational information may be simultaneously distributed to the plurality of substrate processing apparatuses 1. The large number of operators can learn the method of operating the apparatuses 1 by dispersing to each substrate processing apparatus 1 in small groups and observing the educational information displayed on the display parts 130.

In a case of delivering a lecture on operation explanation to unskilled operators of the substrate processing factory 4, the operators may be posted to any substrate processing apparatus 1 which in turn presents a distribution request so that educational information is distributed only to this substrate processing apparatus 1. The operators can learn the method of operating the apparatus 1 by observing the educational information displayed on the display part 130.

In either case, an apparatus vendor can deliver the lecture on operation explanation by simply creating the educational program 2341 and storing the same in the support computer 3, while a user can hold the lecture related to operation explanation repeatedly at desired timing for efficiently educating the operators with reference to the operation.

Figure 21:
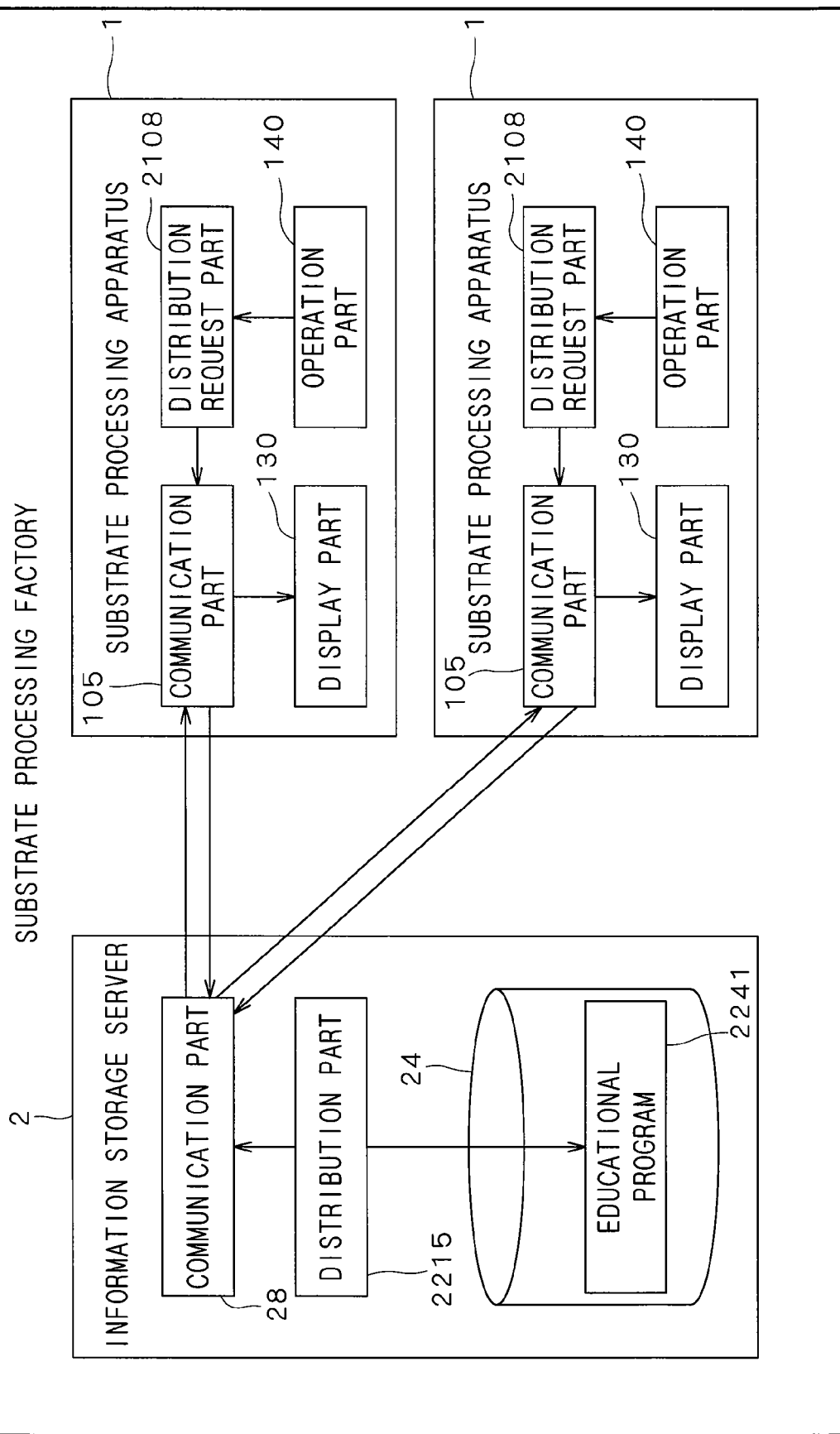
FIG. 21 is a functional block diagram showing another exemplary functional structure of the substrate processing system according to the fourth embodiment.

While the support computer 3 stores the educational program 2341 so that the support center 5 distributes the educational information to the substrate processing apparatus 1 through the Internet in the fourth embodiment, the information storage server 2 may alternatively have the role of the support computer 3. FIG. 21 is a functional block diagram showing another exemplary functional structure of the substrate processing system 10 according to the fourth embodiment. Referring to FIG. 21, a CPU 21 of an information storage server 2 runs a control program thereby implementing a distribution part 2215 as a processing part.

A hard disk 24 comprised in the information storage server 2 stores an educational program 2241. The CPU 21 of the information storage server 2 reads and runs this educational program 2241 so that the distribution part 2215 can distribute educational information related to operation of each substrate processing apparatus 1 of a substrate processing factory 4 from a communication part 28 through a LAN 41. The mode and the timing of distribution are similar to those of the aforementioned embodiment. When distributing the educational information through the LAN 41, an apparatus vendor can also deliver a lecture on operation explanation by simply creating the educational program 2241 and storing the same in the information storage server 2, while a user can hold the lecture related to operation explanation repeatedly at desired timing for efficiently educating operators with reference to the operation.

The technique according to the present invention is applicable to any substrate processing apparatus, such as a lamp annealing apparatus heating substrates by photoirradiation, a cleaning apparatus performing cleaning processing of removing particles while rotating substrates or a dipping apparatus performing surface processing by dipping substrates in a processing solution such as hydrofluoric acid, for example, performing prescribed processing on substrates.

While the invention has been shown and described in detail, the foregoing description is in all aspects illustrative and not restrictive. It is therefore understood that numerous modifications and variations can be devised without departing from the scope of the invention.

What is claimed is:

1. A substrate processing apparatus management system comprising a substrate processing apparatus configured to be used in a substrate processing factory, a computer included in a support center in which operators for doing maintenance are posted and configured to manage operation of the substrate processing apparatus, and an order acceptance server included in a component center supplying components of the substrate processing apparatuses to said substrate processing factory and accepting an order for a component of said substrate processing apparatus, with the substrate processing apparatus, the computer, and the order acceptance server being connected to a communication network, the substrate processing apparatus comprising a consumption measuring element configured to measure the time of use of component of said substrate processing apparatus, said substrate processing apparatus management system comprising:

a consumption information accumulation element configured to accumulate the time of use measured by the consumption measuring element; and a consumption information uploading element rendering the time of use accumulated in the consumption information accumulation element to be readable from the computer as transmitted through the communication network, said computer comprising an order signal transmission element configured to transmit an order signal to said order acceptance server to order and obtain a new component for replacement of the component, the order signal being transmitted when time of use of the component accumulated in said consumption information accumulation element reaches a prescribed value.

2. The substrate processing apparatus management system according to claim 1, wherein the computer comprises a warning element configured to give a warning for prompting replacement exchange of the consumable component for a new component when the time of use of the component accumulated in the consumption information accumulation element reaches a prescribed value.

3. A substrate processing apparatus management system comprising a substrate processing apparatus included in a substrate processing factory, a computer included in a support center in which operators for doing maintenance are posted and configured to manage operation of the substrate processing apparatus, and an order acceptance server comprised in a component center supplying components of the substrate processing apparatuses to said substrate processing factory and accepting an order for a component of said substrate processing apparatus, with the substrate processing apparatus, the computer, and the order acceptance server being connected to a communication network, the substrate processing apparatus comprising a consumption measuring element configured to measure the number of substrates processed of using component of said substrate processing apparatus, said substrate processing apparatus management system comprising:

a consumption information accumulation element configured to accumulate the number of substrates processed measured by the consumption measuring element; and a consumption information uploading element rendering the number of substrates processed accumulated in the consumption information accumulation element to be readable from the computer as transmitted through the communication network, said computer comprising an order signal transmission element configured to transmit an order signal to said order acceptance server to order and obtain a new component for replacement exchange of the component, the order signal being transmitted when the number of substrates processed of the component accumulated in said consumption information accumulation element reaches a prescribed value.

4. The substrate processing apparatus management system according to claim 3, wherein the computer comprises a warning element configured to give a warning for prompting replacement exchange of the consumable component for a new component when the number of substrates processed of the component accumulated in the consumption information accumulation element reaches a prescribed value.

5. A substrate processing apparatus management system comprising a plurality of substrate processing apparatuses included in a substrate processing factory, a computer included in a support center in which operators for doing maintenance are posted and configured to manage the operation of the plurality of substrate processing apparatuses, and an order acceptance server comprised in a component center supplying components of the substrate processing apparatuses to said substrate processing factory and accepting an order for a component of said substrate processing apparatus, the substrate processing apparatuses, the computer, and the order acceptance server being connected to a communications network, wherein each of the plurality of substrate processing apparatuses comprising a time of use measuring element configured to measure the time of use of components of the substrate processing apparatuses, the substrate processing apparatus management system comprising an order signal transmission element configured to transmit an order signal to said order acceptance server to order and obtain a new component for replacement exchange of the component, the order signal being transmitted when time of use of either one of the components of said plurality of substrate processing apparatuses reaches a prescribed value; and a warning element configured to give a warning for prompting replacement exchange of the component for a new component of any of the plurality of substrate processing apparatuses when the time of use of the component reaches a prescribed value.

6. A substrate processing apparatus management system comprising a plurality of substrate processing apparatuses included in a substrate processing factory, a computer included in a support center in which operators for doing maintenance are posted and configured to manage the operation of the plurality of substrate processing apparatuses, and an order acceptance server comprised in a component center supplying components of the substrate processing apparatuses to said substrate processing factory and accepting an order for a component of said substrate processing apparatus, the substrate processing apparatuses, the computer, and the order acceptance server being connected to a communications network, wherein each of the plurality of substrate processing apparatuses comprises the number of substrates processed measuring element configured to measure the number of substrates processed of using components of the substrate processing apparatuses, the substrate processing apparatus management system comprising an order signal transmission element configured to transmit an order signal to said order acceptance server to order and obtain a new component for replacement exchange of the component, the order signal being transmitted when the number of substrates processed of either one of the components of said plurality of substrate processing apparatuses reaches a prescribed value; and
a warning element configured to give a warning for prompting replacement exchange of the component for a new component of any of the plurality of substrate processing apparatuses when the number of substrates processed of the component reaches a prescribed value.

* * * * *